(12) United States Patent
Lynam

(10) Patent No.: US 7,581,859 B2
(45) Date of Patent: Sep. 1, 2009

(54) DISPLAY DEVICE FOR EXTERIOR REARVIEW MIRROR

(75) Inventor: Niall R Lynam, Holland, MI (US)

(73) Assignee: Donnelly Corp., Holland, MI (US)

( * ) Notice: Subject to any disclaimer, the term of this patent is extended or adjusted under 35 U.S.C. 154(b) by 239 days.

(21) Appl. No.: 11/520,193

(22) Filed: Sep. 13, 2006

(65) Prior Publication Data

US 2007/0058257 A1 Mar. 15, 2007

Related U.S. Application Data

(60) Provisional application No. 60/717,093, filed on Sep. 14, 2005.

(51) Int. Cl.
*B60Q 1/26* (2006.01)
*B60Q 1/00* (2006.01)
*B60R 1/12* (2006.01)

(52) U.S. Cl. ........................ 362/494; 362/501
(58) Field of Classification Search .............. 362/494, 362/501
See application file for complete search history.

(56) References Cited

U.S. PATENT DOCUMENTS

| | | | |
|---|---|---|---|
| 2,263,382 A | 11/1941 | Gotzinger |
| 2,580,014 A | 12/1951 | Gazda |
| 3,280,701 A | 10/1966 | Donnelly et al. |
| 4,171,875 A | 10/1979 | Taylor et al. |
| 4,499,451 A | 2/1985 | Suzuki et al. |
| 4,588,267 A | 5/1986 | Pastore |
| 4,623,222 A | 11/1986 | Itoh et al. |
| 4,630,904 A | 12/1986 | Pastore |
| 4,694,295 A | 9/1987 | Miller et al. |
| 4,721,364 A | 1/1988 | Itoh et al. |
| 4,906,085 A | 3/1990 | Sugihara et al. |
| 4,926,170 A | 5/1990 | Beggs et al. |
| 4,943,796 A | 7/1990 | Lee |
| 5,173,881 A | 12/1992 | Sindle |
| 5,223,814 A | 6/1993 | Suman |
| 5,229,975 A | 7/1993 | Truesdell et al. |
| 5,235,316 A | 8/1993 | Qualizza |

(Continued)

FOREIGN PATENT DOCUMENTS

CA 1063695 10/1979

(Continued)

*Primary Examiner*—Ali Alavi
*Assistant Examiner*—William J Carter
(74) *Attorney, Agent, or Firm*—Van Dyke, Gardner, Linn & Burkhart, LLP

(57) ABSTRACT

An exterior mirror sub-assembly includes a reflective element, a back plate, and a display element having a light source that is activatable to emit light. The display element attaches to a display receiving portion of the back plate and the light source is activatable to emit light through the display receiving portion. The display receiving portion may be configured to orient the display element at a predetermined angle so that light exiting the display element when the light source is activated may be directed (a) generally away from the vehicle when the mirror assembly is mounted to the vehicle so as to be principally viewed by drivers of other vehicles or (b) generally toward the driver of the vehicle when the mirror assembly is mounted to the vehicle so as to be principally viewed by the driver of the host vehicle.

36 Claims, 14 Drawing Sheets

U.S. PATENT DOCUMENTS

| | | | |
|---|---|---|---|
| 5,280,555 | A | 1/1994 | Ainsburg |
| 5,313,335 | A | 5/1994 | Gray et al. |
| 5,339,075 | A | 8/1994 | Abst et al. |
| 5,340,503 | A | 8/1994 | Varaprasad et al. |
| 5,371,659 | A | 12/1994 | Pastrick et al. |
| 5,373,482 | A | 12/1994 | Gauthier |
| 5,424,726 | A | 6/1995 | Beymer |
| 5,424,952 | A | 6/1995 | Asayama |
| 5,481,409 | A | 1/1996 | Roberts |
| 5,497,305 | A | 3/1996 | Pastrick et al. |
| 5,497,306 | A | 3/1996 | Pastrick |
| 5,535,056 | A | 7/1996 | Caskey et al. |
| 5,550,677 | A | 8/1996 | Schofield et al. |
| 5,575,552 | A | 11/1996 | Faloon et al. |
| 5,587,699 | A | 12/1996 | Faloon et al. |
| 5,631,639 | A | 5/1997 | Hibino et al. |
| 5,668,675 | A | 9/1997 | Fredricks |
| 5,669,699 | A | 9/1997 | Pastrick et al. |
| 5,670,935 | A | 9/1997 | Schofield et al. |
| 5,715,093 | A | 2/1998 | Schierbeek et al. |
| 5,724,187 | A | 3/1998 | Varaprasad et al. |
| 5,751,489 | A | 5/1998 | Caskey et al. |
| 5,786,772 | A | 7/1998 | Schofield et al. |
| 5,788,357 | A | 8/1998 | Muth et al. |
| 5,796,094 | A | 8/1998 | Schofield et al. |
| 5,823,654 | A | 10/1998 | Pastrick et al. |
| 5,900,999 | A | 5/1999 | Huizenga et al. |
| 5,929,786 | A | 7/1999 | Schofield et al. |
| 5,938,320 | A | 8/1999 | Crandall |
| 5,986,364 | A | 11/1999 | Bingle et al. |
| 6,005,724 | A | 12/1999 | Todd |
| 6,065,840 | A | 5/2000 | Caskey et al. |
| 6,176,602 | B1 | 1/2001 | Pastrick et al. |
| 6,196,688 | B1 | 3/2001 | Caskey et al. |
| 6,198,409 | B1 | 3/2001 | Schofield et al. |
| 6,201,642 | B1 | 3/2001 | Bos |
| 6,213,612 | B1 | 4/2001 | Schnell et al. |
| 6,227,689 | B1 | 5/2001 | Miller |
| 6,229,226 | B1 | 5/2001 | Kramer et al. |
| 6,243,218 | B1 | 6/2001 | Whitehead |
| 6,257,746 | B1 | 7/2001 | Todd et al. |
| 6,276,821 | B1 | 8/2001 | Pastrick et al. |
| 6,286,965 | B1 | 9/2001 | Caskey et al. |
| 6,315,419 | B1 | 11/2001 | Platzer, Jr. |
| 6,356,376 | B1 | 3/2002 | Tonar et al. |
| 6,362,548 | B1 | 3/2002 | Bingle et al. |
| 6,396,397 | B1 | 5/2002 | Bos et al. |
| 6,467,920 | B2 | 10/2002 | Schnell et al. |
| 6,498,620 | B2 | 12/2002 | Schofield et al. |
| 6,512,624 | B2 | 1/2003 | Tonar et al. |
| 6,522,451 | B1 | 2/2003 | Lynam |
| 6,582,109 | B2 | 6/2003 | Miller |
| 6,685,864 | B2 | 2/2004 | Bingle et al. |
| 6,690,268 | B2 | 2/2004 | Schofield et al. |
| 6,700,692 | B2 | 3/2004 | Tonar et al. |
| 6,717,712 | B2 | 4/2004 | Lynam et al. |
| 6,755,544 | B2 | 6/2004 | Schnell et al. |
| 6,855,431 | B2 | 2/2005 | Varaprasad et al. |
| 6,882,287 | B2 | 4/2005 | Schofield |
| 6,902,284 | B2 | 6/2005 | Hutzel et al. |
| 6,916,100 | B2 | 7/2005 | Pavao |
| 6,919,796 | B2 | 7/2005 | Boddy et al. |
| 6,926,431 | B1 | 8/2005 | Foote et al. |
| 7,038,577 | B2 | 5/2006 | Pawlicki et al. |
| 7,073,914 | B2 | 7/2006 | Pavao |
| 7,080,914 | B1 | 7/2006 | Boddy |
| 7,083,312 | B2 | 8/2006 | Pastrick et al. |
| 7,090,363 | B1 | 8/2006 | Boddy et al. |
| 7,097,312 | B2 | 8/2006 | Platzer, Jr. |
| 7,126,456 | B2 | 10/2006 | Boddy et al. |
| 7,184,190 | B2 | 2/2007 | McCabe et al. |
| 7,195,381 | B2 | 3/2007 | Lynam et al. |
| 7,255,451 | B2 | 8/2007 | McCabe et al. |
| 7,274,501 | B2 | 9/2007 | McCabe et al. |
| 2003/0002179 | A1* | 1/2003 | Roberts et al. .............. 362/494 |
| 2005/0134983 | A1 | 6/2005 | Lynam |
| 2005/0232469 | A1 | 10/2005 | Schofield et al. |
| 2006/0050018 | A1 | 3/2006 | Hutzel et al. |
| 2006/0061008 | A1 | 3/2006 | Karner et al. |
| 2006/0125919 | A1 | 6/2006 | Camilleri et al. |
| 2006/0164230 | A1 | 7/2006 | DeWind et al. |
| 2006/0171704 | A1 | 8/2006 | Bingle et al. |
| 2006/0181772 | A1 | 8/2006 | Byers et al. |
| 2006/0184297 | A1 | 8/2006 | Higgins-Luthman |

FOREIGN PATENT DOCUMENTS

| | | |
|---|---|---|
| WO | WO 2007/005942 | 1/2007 |
| WO | WO 2006/124682 | 7/2007 |

\* cited by examiner

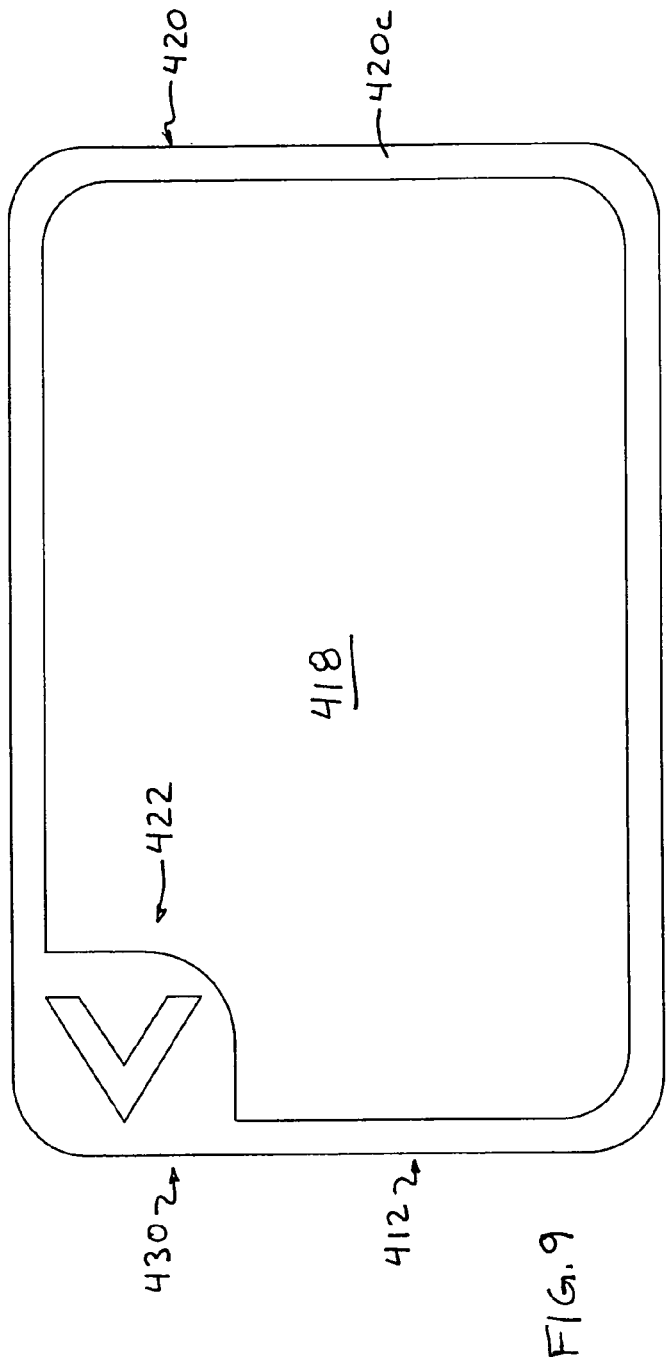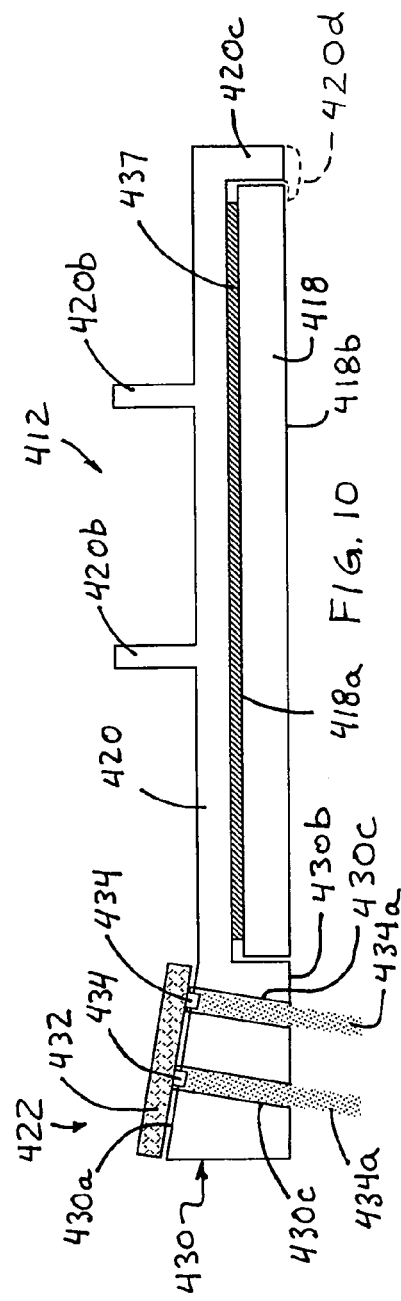

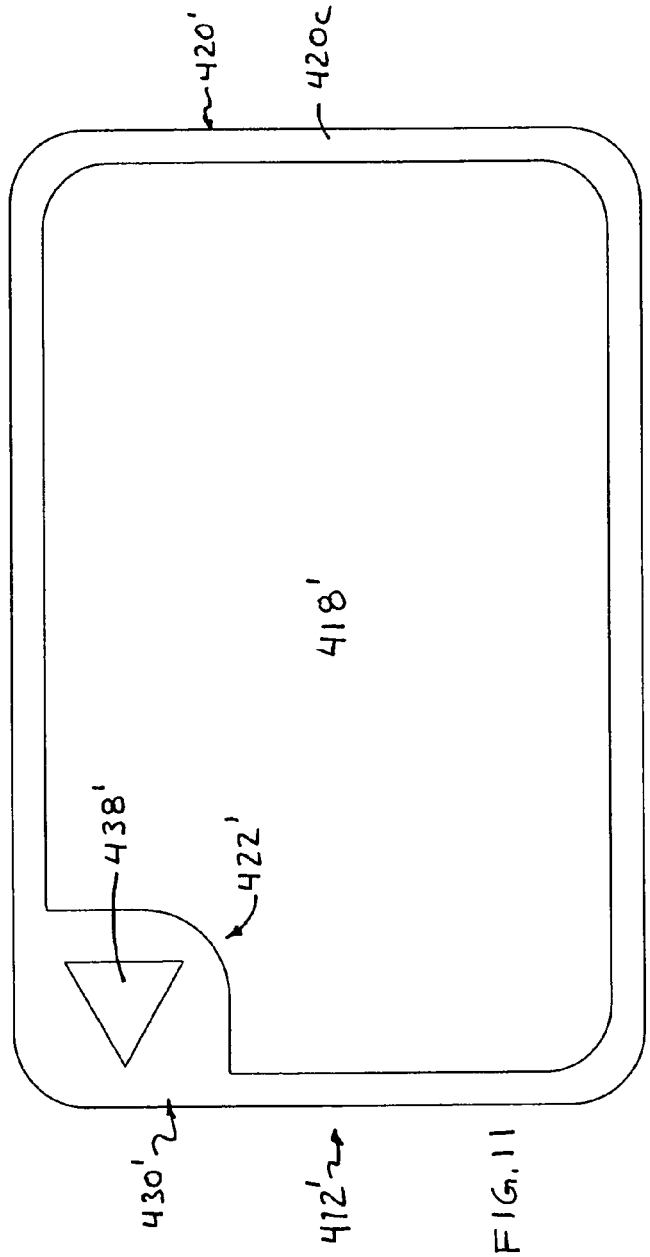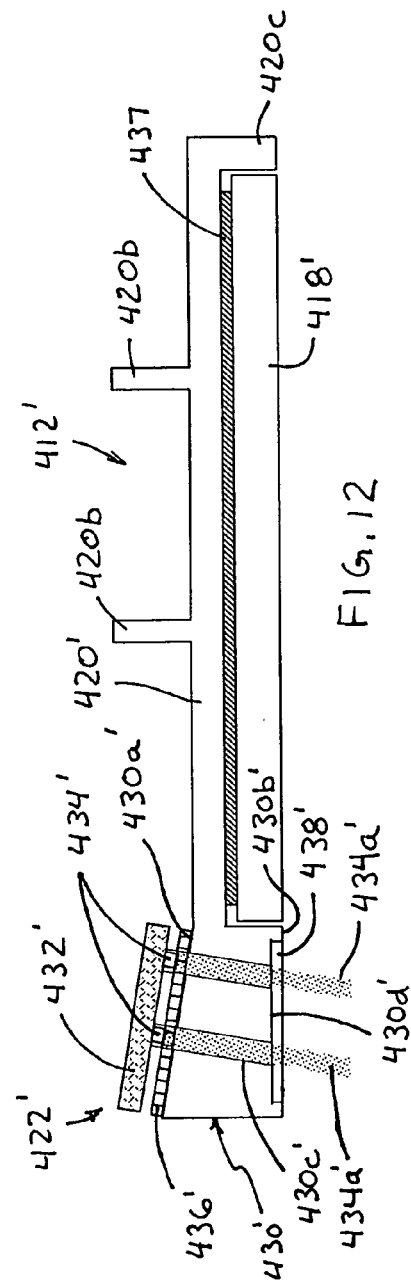

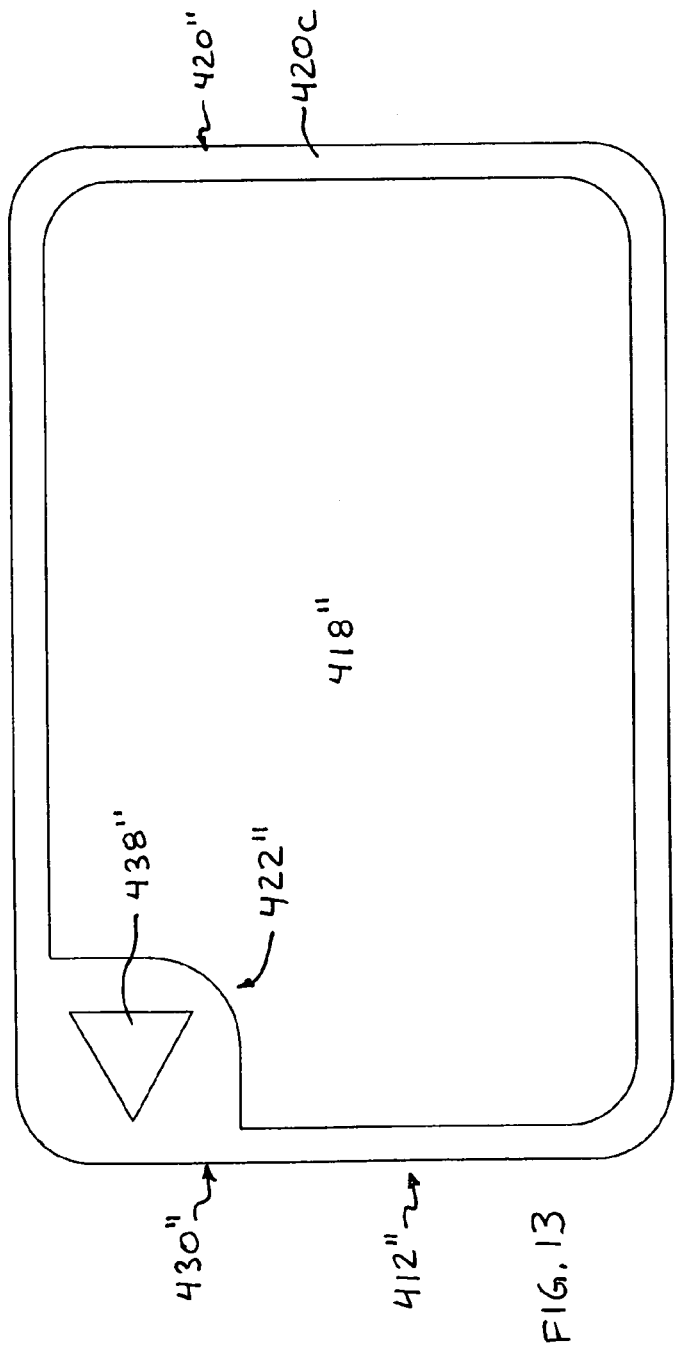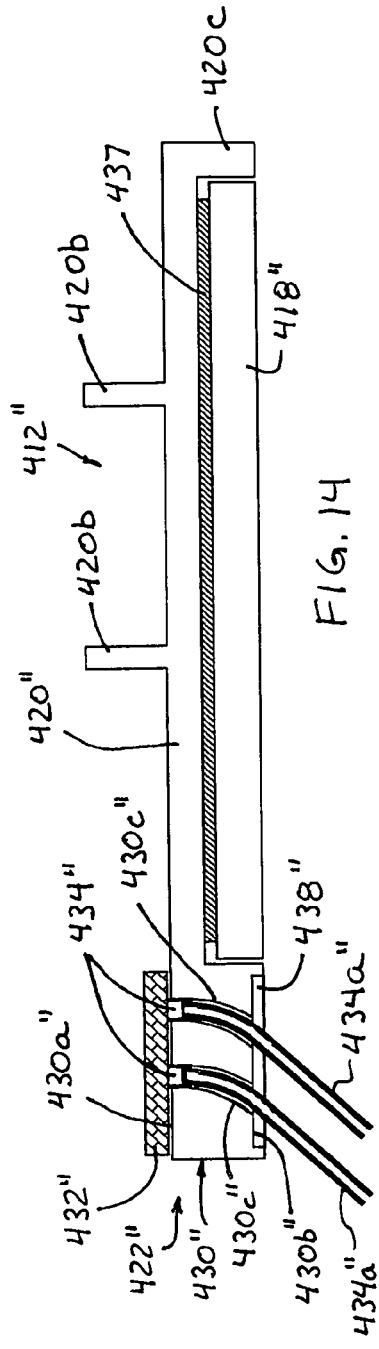

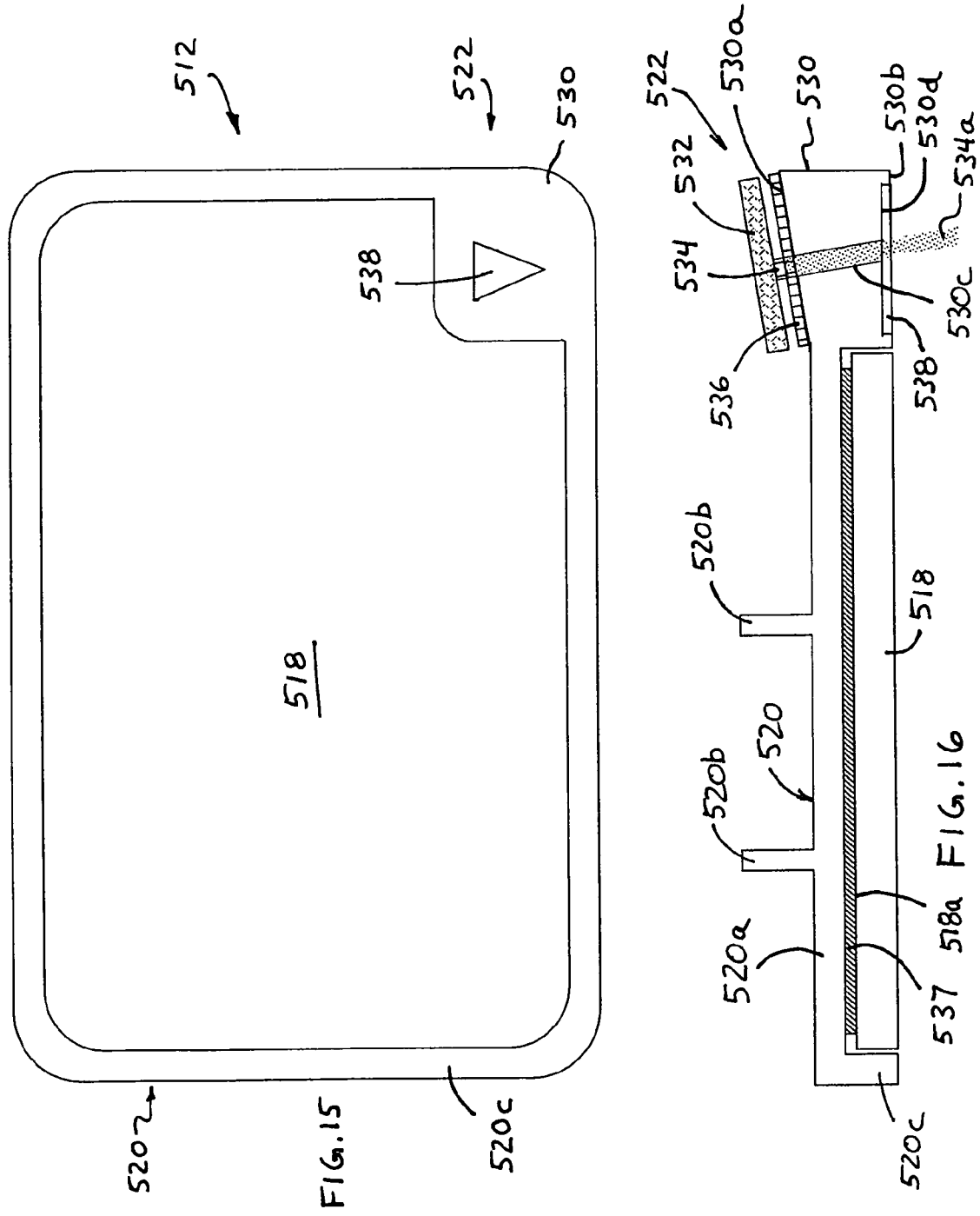

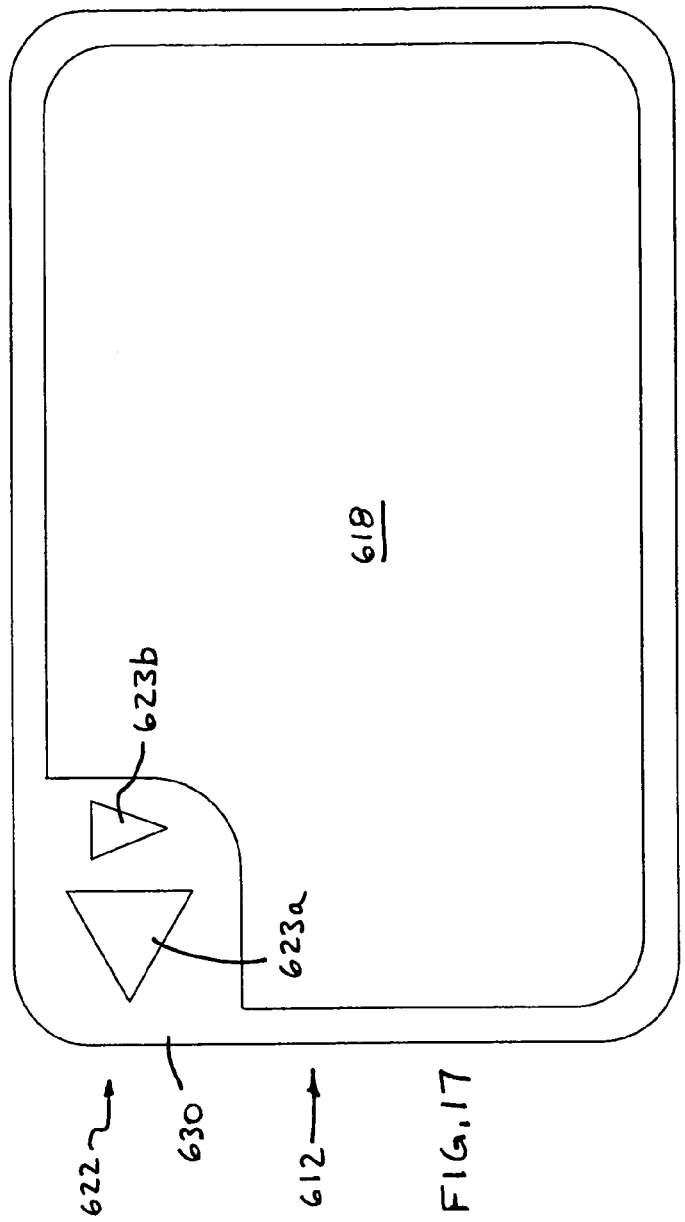
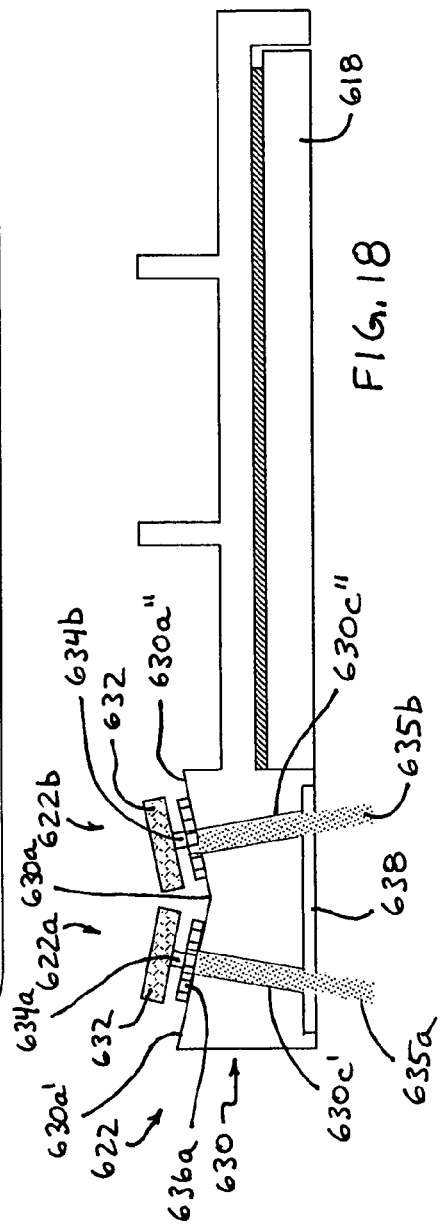

DISPLAY DEVICE FOR EXTERIOR REARVIEW MIRROR

CROSS REFERENCE TO RELATED APPLICATION

The present claims the benefit of U.S. provisional application, Ser. No. 60/717,093, filed Sep. 14, 2005, which is hereby incorporated herein by reference in its entirety.

FIELD OF THE INVENTION

The present invention relates to exterior rearview mirror assemblies and, more particularly, to an exterior rearview mirror assembly having a blind spot/object detection indicator and/or a lane change aid (LCA) indicator and/or a turn signal or indicator at the exterior rearview mirror assembly.

BACKGROUND OF THE INVENTION

It is known to provide an object in a blind spot detection/LCA system for a vehicle that detects the presence of another vehicle or object in the lane next to the host vehicle, where it may be difficult for the driver of the host vehicle to determine whether or not there is another vehicle or object adjacent to the host vehicle. Such an object in a blind spot detection/LCA system often includes a visual indicator that visually indicates the detection of another vehicle or object to the driver of the host vehicle. It is also know to provide a turn signal indicator that is activated when a turn signal is activated by the driver of the host vehicle so as to provide an indication of the vehicle turning or changing lanes to the driver of a vehicle in an adjacent lane to the host or subject vehicle or to another person external to the host or subject vehicle. The visual indicator or indicators (commonly a light emitting diode or the like) of such systems is/are often located at the mirror reflective element of the exterior rearview mirror assembly.

The object/LCA visual indicator or indicators indicate or alert the driver of the host vehicle of the presence or impending presence of another vehicle or object in a blind spot in an adjacent side lane that typically cannot be readily seen within the field of view of the exterior mirror reflective element of the exterior mirror assembly mounted at that side of the vehicle and/or cannot be readily seen by the driver's peripheral vision or the like. The object/LCA visual indicators typically are arranged to be viewable principally or solely by the driver of the host vehicle and not by drivers of other vehicles. Similarly, the turn signal visual indicator or indicators indicate or alert a person external of the host vehicle (such as the driver of another vehicle alongside or approaching the host vehicle) that the turn signal of the host vehicle is activated to indicate that the driver of the host vehicle is contemplating or commencing a turn or lane change or the like. It is desirable that such turn signal visual indicators are not readily viewable by the driver of the host vehicle when they are activated. Because of vehicle regulations and mirror and vehicle configurations and geometries, and because of the need to provide an uninterrupted reflective surface to satisfy the likes of the FMVSS 111 field of view regulation, blind spot/LCA indicators in the prior art are typically located towards or at the outboard edge, and typically towards or at the upper corner/quadrant, of the reflective mirror element of the exterior mirror assembly.

Somewhat costly and complicated indicator constructions have been contemplated that, when placed behind and supported by the mirror reflective element, attempt to have their projected beam of emitted light directed principally to be viewed by the driver of the host vehicle (or other person external to the host vehicle for turn signal applications) through the mirror reflective element and shielded from view by other drivers (or from the driver of the host vehicle for turn signal applications). In some applications, the mirror reflective element may have a transflective reflector coating or may have a window or port formed in a non-transflective reflector coating. For example, transflective mirror coatings (such as, for example, those described in U.S. Pat. Nos. 3,280,701; 6,855,431; 5,724,187; 5,340,503; 6,286,965; 6,196,688; 5,535,056; 5,751,489; and 6,065,840, which are hereby incorporated herein by reference in their entireties) may be used, or alternately, a transmissive window or port may be formed in the reflective coating or coatings of the mirror reflective element. An illumination source or indicator may be positioned so as to direct or emit illumination through the window or display area and toward the driver of the host vehicle so as to be viewable by the driver of the host vehicle (or outwardly away from the vehicle so as to be generally not viewable by the driver of the host vehicle for turn signal applications).

Such a mirror assembly and indicator often include a baffle or other light directing element and an illumination source positioned at the rear of the mirror reflective element (and generally at the transmissive window or port if applicable). The baffle or light directing element directs the light or illumination from the illumination source toward the desired or appropriate viewer (such as the driver of the host vehicle for blind spot/LCA applications or the driver of another vehicle for turn signal applications) and away from others (such as away from other drivers for blind spot/LCA applications or away from the driver of the host vehicle for turn signal applications).

Typically, such baffles or light directing elements are adhered to the rear surface of the mirror reflective element. In some applications, the illumination source may be provided as a module to the mirror assembly facility and adhered to the rear of the mirror reflective element as a unit or module (for instance, light from LEDs facing and emitting light in the direction away from the mirror element may be reflected back towards the mirror reflector, and hence through the mirror element, using suitably angled or disposed mirrored surfaces). After the baffle or module is attached to the reflective element, the back plate of the mirror assembly may be adhered to the mirror reflective element to complete the mirror reflector sub assembly that is then assembled with the actuator and casing and other components to form the complete mirror assembly for mounting to the side of the vehicle.

A variety of interior and exterior mirror assemblies with indicators are known in the art, such as U.S. Pat. Nos. 5,788,357; 6,257,746; 6,005,724; 5,481,409; 6,512,624; 6,356,376; 2,263,382; 2,580,014; 3,266,016; 4,499,451; 4,588,267; 4,630,904; 4,623,222; 4,721,364; 4,906,085; 5,313,335; 5,587,699; 5,575,552; 5,938,320; 6,700,692; and 5,786,772, Canadian Pat. No. CA 1,063,695, Pat. Abstracts of Japan Publication No. 0917573, published Jul. 8, 1997, which are all hereby incorporated herein by reference in their entireties.

Therefore, there is a need in the art for an improved object in a blind spot/LCA indicator that is readily viewable by a driver of the host vehicle and not visible or viewable by a driver of another vehicle and/or an improved turn signal indicator that is readily viewable by the driver of another vehicle and not visible or viewable by the driver of the host vehicle.

SUMMARY OF THE INVENTION

The present invention provides an object in a blind spot indicator or lane change assist (LCA) indicator or turn signal indicator or other indicator that is integral with the mirror reflector carrier or back plate of the mirror reflector sub-assembly so as to be positioned at and attached to the mirror reflective element as the back plate is adhered or otherwise attached at the back of the mirror reflective element. Preferably, the signal indicator is provided as a sealed or substantially sealed unit or module that can be snapped into or otherwise attached or secured (preferably mechanically but optionally adhesively) at the mirror back plate, preferably at the mirror sub-assembly manufacturing operation when the mirror reflective element (and any associated heater or other item or element) is joined to the mirror back plate. The present invention thus provides a mirror reflector carrier or back plate with an integrated blind spot indicator/indicators and/or turn signal indicator/indicators and/or other indicator/indicators.

According to an aspect of the present invention, an exterior rearview mirror assembly for a vehicle includes a mirror reflective element, a back plate and an indicator or display device. The back plate is attached to the rear surface of the reflective element (the surface opposite the front surface, with the front surface facing generally rearward and toward the driver of the vehicle when the mirror assembly is mounted to the vehicle) and includes an indicator mount or mounting portion for mounting the indicator at the back plate. The indicator mounting portion extends rearward away from the reflective element and may be integrally formed with the back plate, preferably by injection molding. The indicator mounting portion is formed at an acute angle relative to the rear surface of the back plate and is generally hollow so as to provide a passageway therealong. The indicator is mounted at the indicator mounting portion and is activatable so that illumination from the indicator is directed along the angled indicator mounting portion and is thus viewable through the reflective element by a person viewing the mirror reflective element at a desired or generally corresponding angle.

The back plate may comprise a plastic molding, such as a plastic molding formed by injection molding or co-injection molding or the like. The back plate may be formed with an attaching portion, such as a raised annular ring or annular prongs or annular snaps or the like at its rear surface (opposite from the mounting face or surface that attaches to the mirror reflective element) for attaching the back plate to a mirror actuator (for manually or electrically adjusting an angle of the mirror reflective element relative to the mirror casing).

According to another aspect of the present invention, a mirror reflective element sub-assembly for an exterior rearview mirror assembly of a vehicle includes a mirror reflective element, a mirror back plate attached at a rear surface of the mirror reflective element, and a display element having a light source that is activatable to emit light. The mirror back plate is formed by injection molding and has a display receiving portion established thereat. The display element attaches to the display receiving portion of the mirror back plate and the light source is activatable to emit light through the display receiving portion. The mirror back plate and the display receiving portion are configured to orient the display element at a predetermined angle so that light exiting the display element when the light source is activated is directed one of (a) generally away from the vehicle when the mirror assembly is mounted to the vehicle so as to be principally viewed by drivers of other vehicles and so as to be substantially not viewed by the driver of the host vehicle, and (b) generally toward the driver of the vehicle when the mirror assembly is mounted to the vehicle so as to be principally viewed by the driver of the host vehicle and so as to be substantially not viewed by drivers of other vehicles.

Optionally, the light emanating from the display element when the light source is activated passes through the reflective element before exiting the mirror reflective element sub-assembly. Optionally, the light emanating from the display element when the light source is activated does not pass through the reflective element before exiting the mirror reflective element sub-assembly. The light emanating from the display element when the light source is activated thus may be directed through the display receiving portion at a location separate from the reflective element.

The display receiving portion may include at least one passageway therethrough, with the emitted light being directed through the passageway or passageways. A cover element may be disposed at a forward surface of the display receiving portion, so as to at least partially cover and preferably substantially seal the passageway or passageways of the display receiving portion.

Optionally, the display element is associated with a blind spot detection system of the vehicle. Optionally, the display element is associated with a turn signal of the vehicle. Optionally, the display element may comprise first and second display elements, with a first display element being associated with a turn signal of the vehicle and a second display element being associated with a blind spot detection system of the vehicle.

Therefore, the present invention provides a display device or indicator at the back plate of a mirror reflector sub-assembly. The mirror reflector sub-assembly thus may achieve enhanced assembly processes, and may be supplied or provided to a mirror manufacturer or assembler as a unit that includes the indicator mounting portion (and that may also include the indicator) and display. The integrally formed back plate and indicator mount or mounting portion may be readily attached to the mirror reflective element, and the indicator may be readily plugged into or connected to or received in the indicator mount to assemble the mirror reflector sub-assembly. The back plate may include one or more indicator mounts or mounting portions for providing one or more displays at the reflective element, such as a blind spot/LCA display and/or a turn signal display and/or the like.

These and other objects, advantages, purposes and features of the present invention will become apparent upon review of the following specification in conjunction with the drawings.

BRIEF DESCRIPTION OF THE DRAWINGS

FIG. 9 is a view of another exterior mirror reflector sub-assembly with a display device or indicator in accordance with the present invention, shown as viewed in the direction of travel of the vehicle;

FIG. 10 is a sectional view of the mirror reflector sub-assembly of FIG. 9;

FIG. 11 is a view of another exterior mirror reflector sub-assembly with another display device or indicator in accordance with the present invention, shown as viewed in the direction of travel of the vehicle;

FIG. 12 is a sectional view of the mirror reflector sub-assembly of FIG. 11;

FIG. 13 is a view of another exterior mirror reflector sub-assembly with another display device or indicator in accordance with the present invention, shown as viewed in the direction of travel of the vehicle;

FIG. 14 is a sectional view of the mirror reflector sub-assembly of FIG. 13;

FIG. 15 is a view of another exterior mirror reflector sub-assembly with a display device or indicator in accordance with the present invention, shown as viewed in the direction of travel of the vehicle;

FIG. 16 is a sectional view of the mirror reflector sub-assembly of FIG. 15;

FIG. 17 is a view of another exterior mirror assembly with a display device or indicator in accordance with the present invention, shown as viewed in the direction of travel of the vehicle; and FIG. 18 is a sectional view of the mirror reflector sub-assembly of FIG. 17.

DESCRIPTION OF THE PREFERRED EMBODIMENTS

Figure 1:
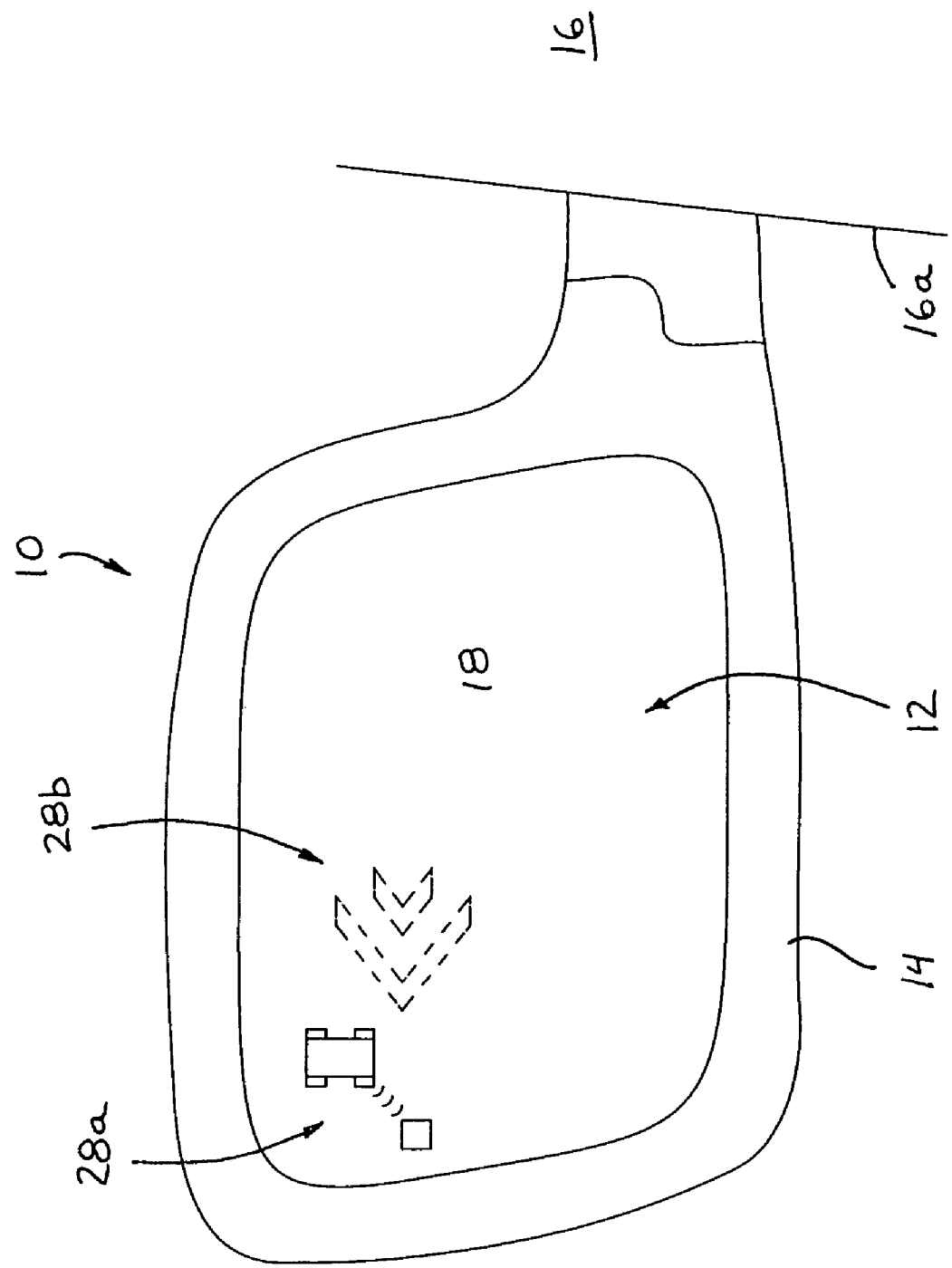
FIG. 1 is a view of an exterior mirror assembly with a display device or indicator in accordance with the present invention, shown as viewed in the direction of travel of the vehicle.
Figure 2:
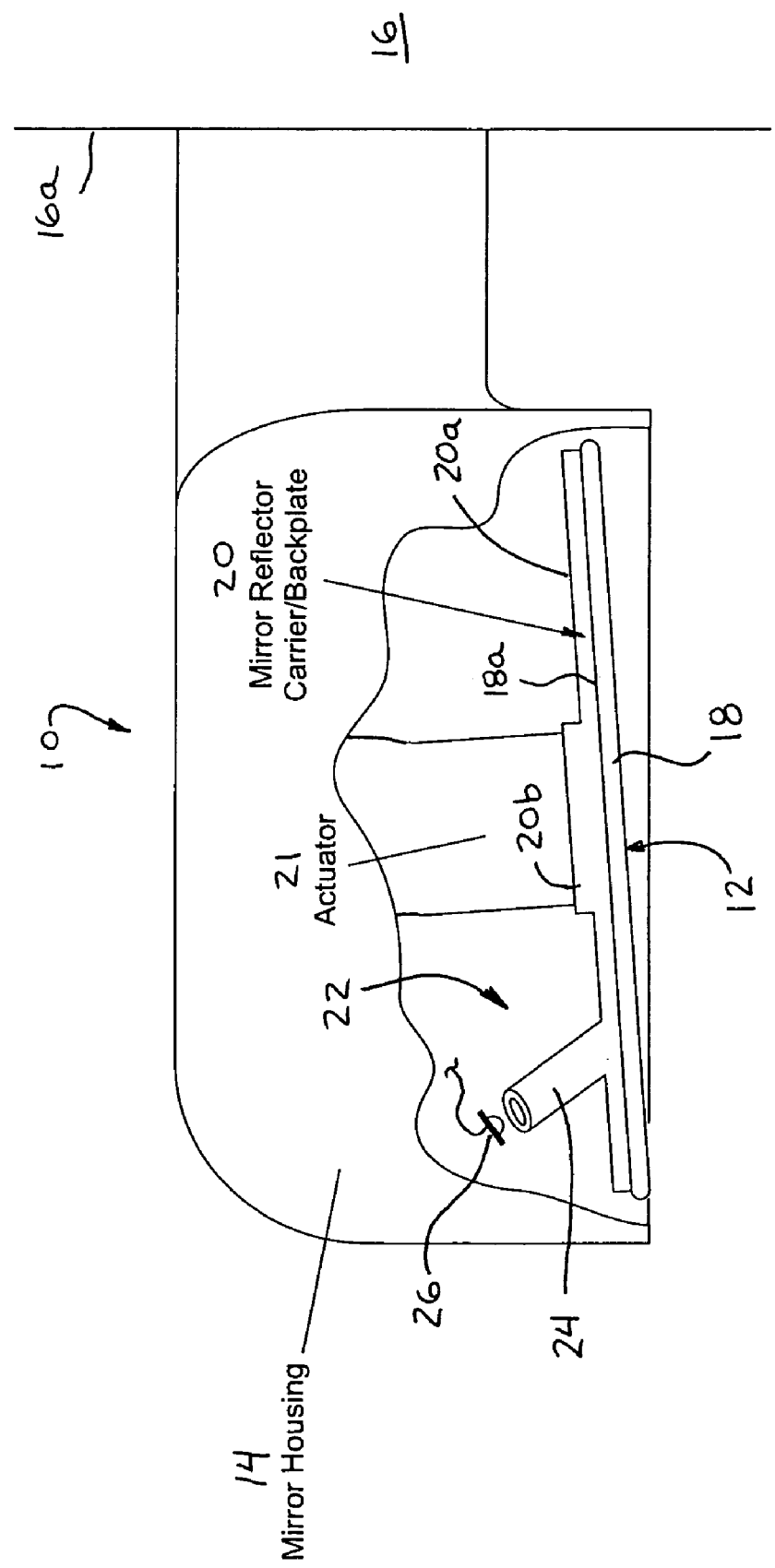
FIG. 2 is a top plan view of the mirror assembly of FIG. 1 with a portion of the casing cut away to show additional details.

Referring now to the drawings and the illustrative embodiments depicted therein, an exterior rearview mirror assembly 10 for a vehicle includes a mirror reflector sub-assembly 12 and a mirror shell or casing 14 (FIG. 1). Mirror assembly 10 is mounted at the side 16a of a host or subject vehicle 16. As shown in FIG. 2, mirror reflector sub-assembly 12 includes a mirror reflective element 18 and a mirror reflector carrier or back plate 20 attached to or mounted to or adhered to a rear surface 18a of mirror reflective element 18. Mirror assembly 10 includes a display element or device 22 that is operable to provide a display or indication at the reflective element for viewing the display or indication through the mirror reflective element. Display device 22 includes a generally hollow indicator mounting portion or indicator receiving portion or extension or tube 24 (that extends rearwardly from a rear surface 20a of back plate 20 so as to extend generally away from the mirror reflective element 18) and an illumination source or indicator 26, which is attached to or mounted to or received in or at the indicator mounting portion 24. In the illustrated embodiment of FIG. 2, the mirror assembly includes a display device 22 for an object in a blind spot detection system or LCA system, as discussed below, but could also or otherwise include a display device for a turn signal indicator or other indicator device (as discussed below).

Optionally, the mirror assembly may include multiple display elements or devices (such as two or more display elements or devices) for providing both an object in a blind spot/LCA indicator and display area 28a and a turn signal indicator and display area 28b, such as shown in FIG. 1 and such as discussed below with respect to FIG. 6. The two or more display devices may be incorporated together into a single unitary display module or unit (and thus with a common connector incorporated in the single unitary module and servicing, for example, a commonly housed turn signal indicator element and blind spot indicator element), or the two or more display devices may be separate display devices (for example, a LCA blind spot indicator unitary module may be disposed at a bottom/lower inward portion of the mirror sub-assembly and a separate turn signal indicator unitary module may be disposed at an upper outward portion of the mirror sub-assembly), while remaining within the spirit and scope of the present invention. Optionally, for example, a turn signal indicator or device or element or module of the present invention may be incorporated into a mirror sub-assembly, and the exterior rearview mirror assembly may include a blind spot or lane change assist indicating device or element at a portion of the mirror casing (such as at an inboard facing portion of the casing), such as by utilizing aspects of the indicating elements described in PCT Application No. PCT/US2006/026148, filed Jul. 5, 2006, which is hereby incorporated herein by reference in its entirety.

Indicator mounting portion 24 is unitarily or integrally formed with back plate 20 and is formed at an acute angle relative to the generally planar rear surface 20a of back plate 20. Indicator 26 is operable or activatable or energizable to provide illumination at and through or along the indicator mounting portion 24, whereby the illumination is viewable through mirror reflective element 18 by a person viewing the mirror assembly 10. The display device 18 may comprise a blind spot or object detection indicating device that is operable to indicate to the driver of the subject or host vehicle that an object or other vehicle is detected at the side or blind spot region of the host vehicle by a blind spot detection system (or may comprise a turn signal indicating device that is operable to indicate to the driver or passenger of another vehicle that the vehicle is turning or changing lanes, or may comprise other forms or types of display or illumination or indicating devices, as discussed below).

Back plate 20 includes an attachment portion 20b (such as an annular ring or tab or annular prongs or annular snaps or the like) for attaching the back plate to an actuator 21, which is adjustable or operable to adjust a viewing angle of mirror reflective element 18. As can be seen in FIG. 2, when the mirror reflective element is canted or angled partially toward the driver of the host vehicle (which is typically the orientation of the reflective element during use so as to provide a generally rearward field of view to the driver of the host vehicle), there is sufficient space within the mirror casing at or near the outboard portion of the mirror assembly for the indicator mounting portion. The back plate and display device of the present invention thus utilizes the space within the mirror head or casing that is already available and typically not used or occupied by other components.

Figure 3:
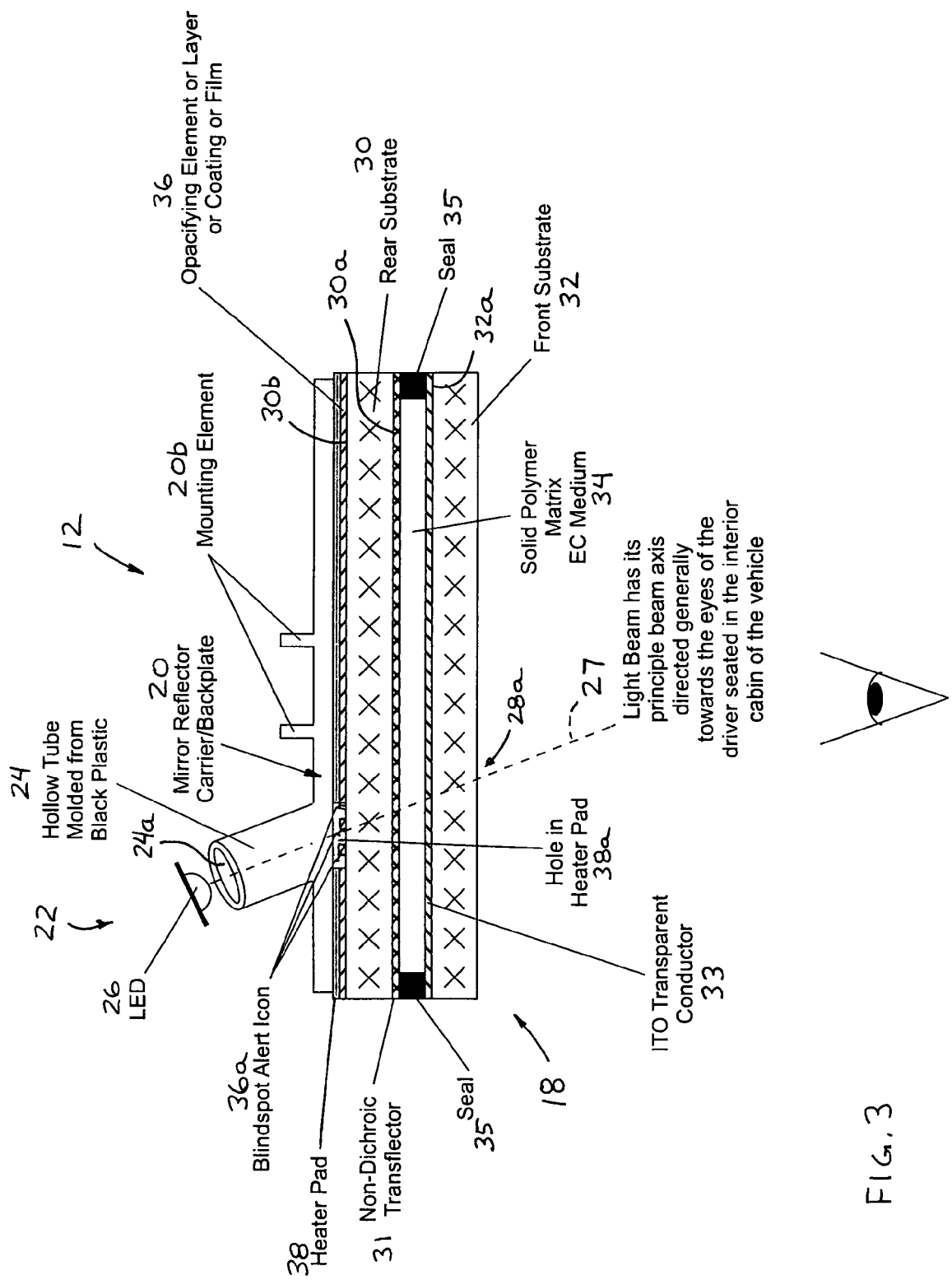
FIG. 3 is a partial sectional view of a mirror reflector sub-assembly having a back plate and display device in accordance with the present invention.

Indicator 26 may include an illumination or light source (such as one or more light emitting diodes (LEDs) or organic light emitting diodes (OLEDs) or the like) that is/are energized to direct or emit illumination through and along indicator mounting portion 24 so that the illumination is viewable through the reflective element. The mirror reflective element may include one or more iconistic display areas (such as the single display area 28a shown in FIG. 3 or the two display areas 28a and 28b shown in FIG. 1) so that the illumination is viewable and discernible at the reflective element by the desired or targeted viewer, depending on the angle of the indicator mounting portion 24. The mirror assembly thus may provide an iconistic display for an object detection/LCA system and/or an iconistic display for a turn signal indication, and/or may provide other displays or illumination devices, without affecting the scope of the present invention. As shown in FIG. 3, the indicator mounting portion may be angled so as to direct the light toward the vehicle and toward a driver or occupant of the host vehicle. More particularly, the light beam emitted from the indicator 26 and transmitted through the reflective element is angled so as to have its principle beam axis 27 directed generally toward the eyes of a driver seated in the interior cabin of the host vehicle.

The indicator may be activated or energized in response to a detection of an object or other vehicle approaching or adjacent to the host vehicle in order to alert or warn the driver of the host vehicle not to attempt or initiate a lane change that moves the subject or host vehicle into the already occupied (or soon to be occupied) side lane or region adjacent either the driver side or the passenger side of the host vehicle. As shown in FIG. 1, display area 28a may be for displaying or indicating to the driver of the host vehicle that an object has been detected in the blind spot, while the display area 28b may be for displaying or indicating a turn signal activation to the driver of another vehicle. In the illustrated embodiment, display area 28a comprises an ISO icon (showing icons representing the host vehicle and another vehicle at the side and/or rearward of the host vehicle) to indicate to the driver of the host vehicle that another vehicle has been detected at the side and/or rearward of the host vehicle.

Optionally, however, the display area may comprise other forms, such as, for example, a multi-stage indicator having multiple indicating portions or elements or devices for indicating a degree of hazard or the like of an object or vehicle detected alongside and/or rearward of the host vehicle (such as an indicating display of the types described in PCT Application No. PCT/US2006/026148, filed Jul. 5, 2006; and U.S. provisional applications, Ser. No. 60/696,953, filed Jul. 6, 2005 by Lynam for VEHICLE EXTERIOR MIRROR ASSEMBLY WITH BLIND SPOT INDICATOR, and Ser. No. 60/784,570, filed Mar. 22, 2006, which are hereby incorporated herein by reference in their entireties), or other types of indicating means, without affecting the scope of the present invention.

In the illustrated embodiment, and as shown in FIG. 3, mirror reflective element 18 comprises an electro-optic (such as electrochromic) reflective element that includes a rear substrate 30 (such as a glass substrate) with a transflective coating or layer 31 (such as a non-dichroic transflector or the like and/or such as utilizing aspects of the transflective reflective elements described below) on its front or forward surface 30a, a front substrate 32 with a transparent conductive coating 33 (such as an indium tin oxide (ITO) or the like) on its rear surface 32a, and an electro-optic medium 34 disposed between the front substrate 32 and rear substrate 30 and contained therebetween via a perimeter seal 35, such as by utilizing aspects of electro-optic or electrochromic reflective elements or cells as discussed below. A dark or opacifying element or layer or coating or film 36 (such as black or dark color, such as dark blue or dark grey, paint or ink or film or coating or tape or lacquer or the like, and preferably a dark, light-absorbing layer that is printed or screened onto the fourth or rear surface of the electrochromic reflective element or cell) is disposed or established on a rear surface 30b of rear substrate 30 of reflective element 18. The dark layer may be established via any suitable establishing methods or means, such as painting, printing, ink jet printing, pad printing, screening or the like.

The icons or pattern that define the display may be established at the rear of the rear substrate 30 and between the rear surface 30b of substrate 30 and the back plate 20. As can be seen with reference to FIGS. 3, 3A and 3B, the icons or pattern that define the display may be established through or defined by the dark layer 36 so that icons or iconistic portions 36a of the dark layer 36 form the icon or icons of the iconistic display area 28a. Optionally, the iconistic portions of the display area may be established by etching the dark layer or by a mask or the like positioned at the rear surface of the substrate during the painting or screening or coating process that applies the dark layer. Optionally, the iconistic portions of the display area may be established by etching or masking at a fourth surface conductive busbar or coating (such as a fourth surface conductive busbar of the types described in U.S. pat. applications, Ser. No. 11/021,065, filed Dec. 23, 2004 by McCabe et al. for ELECTRO-OPTIC MIRROR CELL, now U.S. Pat. No. 7,255,451; and/or Ser. No. 11/334,139, filed Jan. 18, 2006 by Byers et al. for MIRROR ASSEMBLY WITH HEATER ELEMENT, now U.S. Pat. No 7,400,435; and/or U.S. provisional applications, Ser. No. 60/644,903, filed Jan. 19, 2005 by Byers et al. for MIRROR ASSEMBLY WITH HEATER ELEMENT; and Ser. No. 60/667,049, filed Mar. 31, 2005 by Byers et al. for MIRROR ASSEMBLY WITH HEATER ELEMENT, which are hereby incorporated herein by reference). Optionally, the icons or pattern may be established via cutouts or holes or patterns or indicia portions formed in and through or partially through a heater pad (that may be attached to or adhered to the dark or opacifying layer at the rear surface of the reflective element, as discussed below), with the dark layer having an opening or aperture formed therethrough and generally corresponding with the indicia portions of the heater pad when the heater pad is adhered to the dark layer at the rear surface of the reflective element.

Figure 3A:
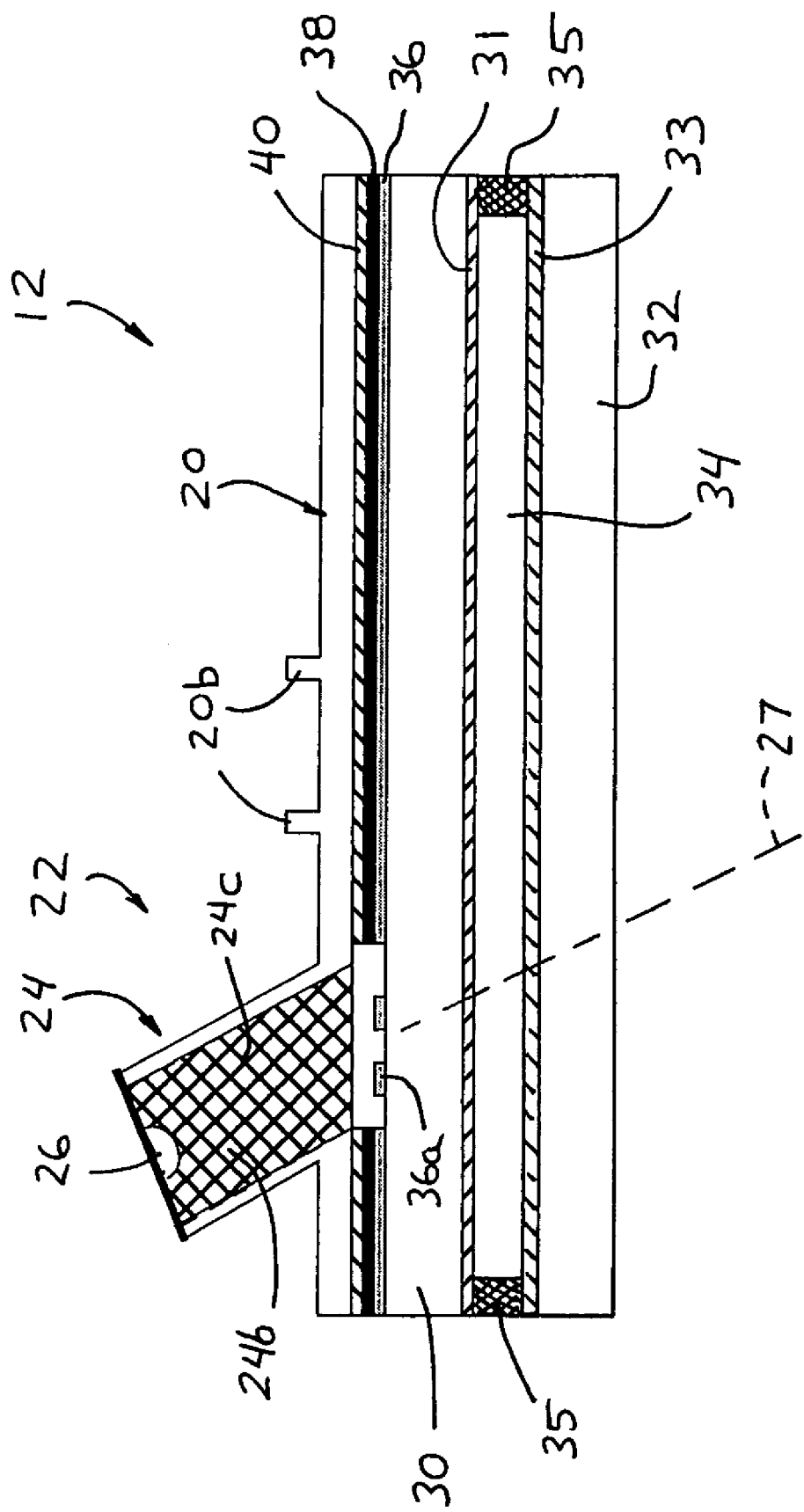
FIG. 3A is a sectional view of the mirror reflector sub-assembly having a back plate and display device in accordance with the present invention.
Figure 3B:
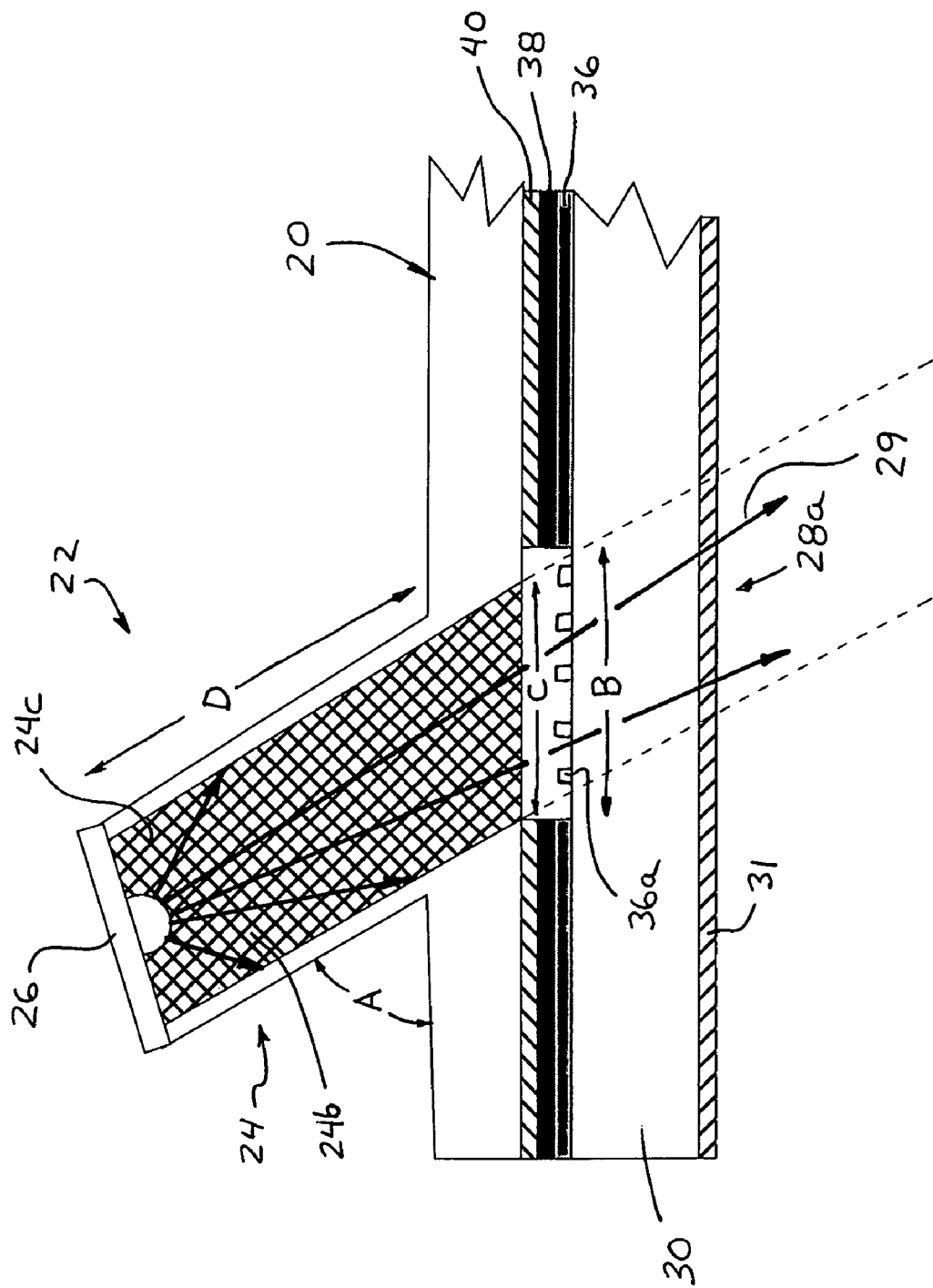
FIG. 3B is an enlarged sectional view of the indicator mounting portion and display area of the mirror reflector sub-assembly of FIG. 3A.

In the illustrated embodiment, mirror reflector sub-assembly 12 includes a heater pad 38 adhered or applied at the rear surface 30b of rear substrate 30 of reflective element 18, such as over the dark or opacifying element or layer 36 as shown in FIGS. 3, 3A and 3B. The heater pad 38 includes a hole or opening or aperture 38a therethrough that generally corresponds to the iconistic portions 36a when the heater pad 38 is attached to the opacifying layer 36 at the rear surface 30b of reflective element 18. As shown in FIGS. 3A and 3B, the heater pad 38 may include an adhesive layer 40 (such as a pressure sensitive adhesive layer) at its rear surface for adhering the back plate 20 to the heater pad 38 and thus to the rear surface 30b of the reflective element 18.

In the illustrated embodiment of FIGS. 3, 3A and 3B, back plate 20 is adhered to heater pad 38 such that indicator mounting portion 24 is positioned or located generally at the aperture 38a of heater pad 38 and the portions 36a of dark layer 36 so as to be generally at the display area 28a of the reflective element. Indicator mounting portion 24 is generally hollow and includes or provides a passageway 24a therethrough or therealong, whereby illumination source or indicator 26 is mounted at or positioned at the outer or rearward end of indicator mounting portion 24 and at or at partially in passageway 24a. Indicator mounting portion 24 is preferably molded of a plastic material, such as a dark or black plastic or polymeric material, and is preferably molded or formed when molding/forming the back plate 20.

Indicator 26 may snap into or may be threaded into the end of the indicator mounting portion 24 or may otherwise be attached or stuck at the end of the indicator mounting portion, and may have a gasket or seal at the indicator to provide a substantially water proof or water resistant or water tight seal at the indicator, whereby the indicator may be sealed at the indicator mounting portion, such as by gluing or pressing or screwing or gasketing or hermetically sealing or otherwise substantially sealing the indicator at the indicator mounting portion. The indicator may comprise a self-contained, unitary, sealed or substantially sealed, indicator module that includes an illumination source (such as one or more LEDs or the like), a DC converter with a voltage dropping resistor (such as described in U.S. Pat. Nos. 6,902,284 and 6,690,268 and/or U.S. patent application Ser. No. 10/054,633, filed Jan. 22, 2002 by Lynam et al. for VEHICULAR LIGHTING SYSTEM, now U.S. Pat. No. 7,195,381, which are hereby incorporated herein by reference in their entireties). The module thus may be connected to a power source and may be activated or energized to illuminate the display for viewing by the driver of the vehicle. Optionally, the electrical connections to the indicator or indicator module may be made while the indicator module is attached to the mirror assembly, such as via a plug and socket type arrangement or configuration, and such as by utilizing aspects of the mirror assembly described in U.S. Pat. No. 6,669,267, which is hereby incorporated herein by reference in its entirety. The unitary indicator module may include or utilize aspects of various light modules or systems or devices, such as the types described in U.S. Pat. Nos. 6,227,689; 6,582,109; 5,371,659; 5,497,306; 5,669,699; 5,823,654; 6,176,602; and/or 6,276,821, which are hereby incorporated herein by reference in their entireties.

Optionally, the module may be supplied or provided to an assembly facility (such as a mirror assembly facility or the like) from a module supplier while the back plate may be supplied or provided to the assembly facility from a back plate supplier. An operator at the assembly facility may attach the module to the back plate, preferably by snapping the module to the back plate to assemble the display or indicator to the back plate. Optionally, and desirably, electrical connection (such as to a power supply or 12 volt power wire of the vehicle battery/ignition system or to a power feed from a LIN bus controller) to the module may be made when the module is snapped or otherwise attached (preferably mechanically but optionally adhesively) to the back plate (such as by making electrical contact between the module and mirror circuitry [including circuitry associated with the reflective element and/or mirror assembly, such as electrochromic mirror circuitry, mirror lights and display circuitry and the like, typically disposed at a printed circuit board of the mirror assembly] when the module is snapped to the back plate, such as by press attaching the display module into receiving fingers or clips or snaps or the like that are integrally formed with the back plate in the injection molding operation that manufactures or forms the back plate itself) or alternately, electrical connection to the module may be made via other means, such as wires or leads or the like before or after the module is snapped or attached to the back plate.

As best seen in FIG. 3B, indicator mounting portion 24 extends at an acute angle A (such as approximately seventy to eighty degrees or thereabouts) relative to the plane defined by back plate 20 so as to direct or guide light through the passageway and in the desired direction for viewing the object/LCA indication principally or solely by the driver of the host vehicle. Indicator mounting portion 24 thus directs the illumination from indicator 26 to and through the reflective element to illuminate the display area 28a so that the iconistic display is viewable by the driver of the vehicle.

Preferably, indicator mounting portion 24 includes light absorbing means to substantially absorb non-axially directed light rays passing through the passageway 24a (such as illustrated via the light rays 29 in FIG. 3B). For example, the inner wall or surface 24b of passageway 24a of indicator mounting portion 24 may be black or dark, and may be at least partially light absorbing, and preferably substantially light absorbing, and most preferably fully light absorbing of light incident thereon. Thus, principally only light rays that pass substantially or entirely through the full length of the inner passageway exit the end of the light emitting passageway, and, therefore, the light emitting source is mainly visible only by viewing axially along or substantially along the line of direction of the passageway. This helps ensure that, for example, only a driver of the host vehicle principally sees and views the light source when actuated, such as in a blind spot detection/alert system. As shown in FIGS. 3A and 3B, the inner surface 24b of passageway 24a of indicator mounting portion 24 may include light absorbing elements or structure 24c, such as graining or stippling or holes (where the light may escape or leak from the indicator mounting portion and into the mirror casing where it is not readily seen by a person viewing the mirror assembly) or dark, light absorbing cavities or fluting or the like formed at the inner surface 24b of passageway 24a to provide a rough surface or otherwise diffuse reflecting surface along the passageway 24a. The walls of the indicator mounting portion passageway thus function as a light trap and/or at least partially absorb the light emitted by the indicator and, thus, limit reflecting of light along the extension or indicator mounting portion.

Figure 4:
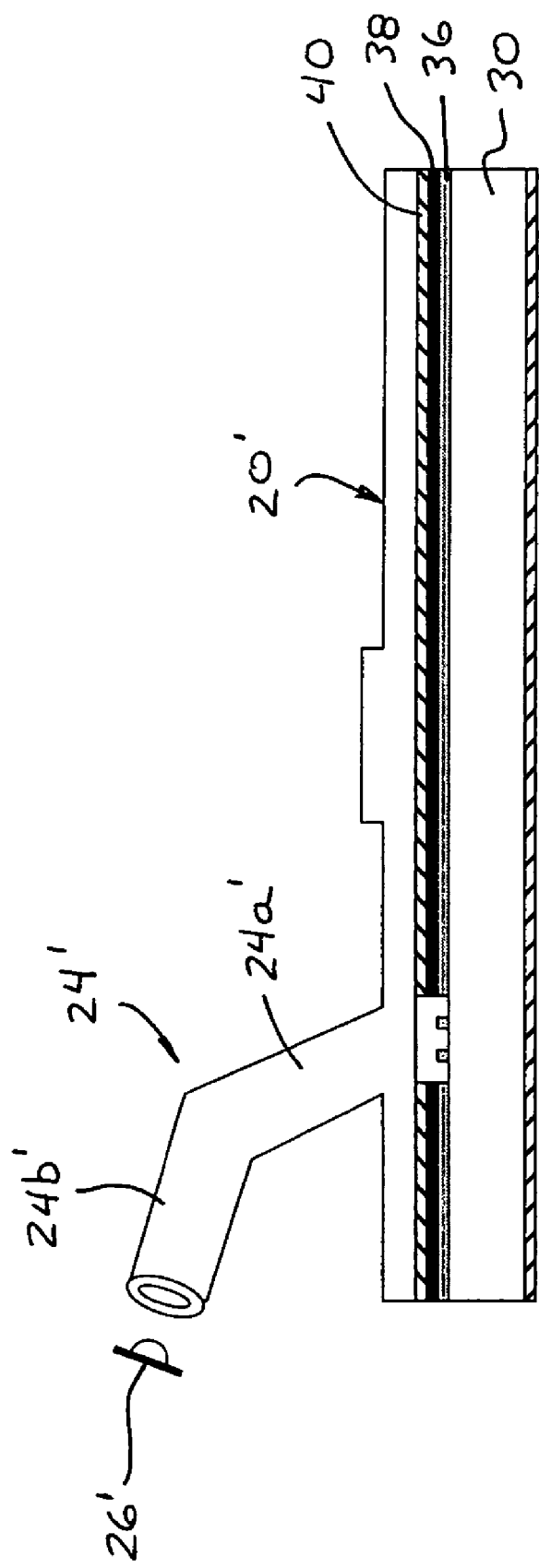
FIG. 4 is a partial sectional view of a portion of another mirror reflector sub-assembly of the present invention.

Optionally, and as shown in FIG. 4, the indicator mounting portion 24' of back plate 20' may be bent or curved or kinked to further trap light or illumination emitted by the indicator. The illumination beam of indicator 26' is thus off-axis with respect to the desired angle of projection of the light (the angle A' of the portion 24a' of indicator mounting portion 24' that is directed toward the driver of the vehicle). The indicator thus may emit light at the bent portion 24b', and the off-axis angled portion 24a' of the indicator mounting portion 24' that is at or adjacent to the reflective element (not shown in FIG. 4) may be at the desired angle so that the principle beam axis of the emitted light is directed generally toward the driver of the vehicle.

Thus, the indicator mounting portion or extension that is integrally formed with the back plate functions as a guide or light directing device or element for directing illumination from the indicator through the mirror reflective element and in the desired direction or angle for viewing principally by the driver of the vehicle. The angle A (FIG. 3B) of indicator mounting portion 24 relative to back plate 20 may be selected to be directed toward a typical driver's head area when the reflective element is positioned to provide a typical or desired sideward and rearward field of view to a typical driver of the vehicle. The passageway may be generally cylindrical or may be generally conical or non-cylindrical, with a wider end at the reflective element. As shown in FIG. 3B, the width dimension B of the area at which iconistic portions 132a are established may be wider than the dimension C at the passageway opening at the reflective element. The length D of the indicator mounting portion and passageway may be selected to provide the desired light directing function, and may be selected to be a greater length to provide enhanced directing of light in the desired direction.

Although shown in FIGS. 2 and 3 as having a single indicator mounting portion for providing an object in a blind spot/LCA display/indication to the driver of the host vehicle, the mirror assembly may also or otherwise include a indicator mounting portion and indicator for providing a turn signal indicator or display that is principally viewable by the drivers of other vehicles adjacent to or rearward of the host vehicle. For example, and with reference to FIG. 5, a mirror reflector sub-assembly 112 may include a back plate 120 that has two extensions or indicator mounting portions 124a, 124b integrally formed therewith. Mirror reflector sub-assembly 112 includes a reflective element with a rear substrate 130 having a transflective coating 131 at its front surface 130a and a dark or opacifying element or layer or coating or tape or film 136 at its opposite rear surface. The dark layer 136 forms or defines two iconistic display portions 136a, 136b (in a similar manner as described above) to form or define two display areas 128a, 128b. A pair of indicators or indicator modules 126a, 126b are mounted to or attached to or received in the respective indicator mounting portions 124a, 124b as described above, and are operable or energizable to provide illumination at and along the respective indicator mounting portion so as to illuminate the respective iconistic portions 136a, 136b and display areas 128a, 128b.

For example, indicator mounting portion 124a may be angled as described above to direct the principle beam axis of emitted/transmitted illumination toward the driver of the vehicle so that the iconistic portions 136a and display area. 128a may display an ISO type display or the like, while indicator mounting portion 124b may be angled so that the turn signal light beam emitted by the indicator 126b and transmitted through the reflective element has its principle beam axis directed generally away from the eyes of the driver seated in the interior cabin of the host vehicle and generally away from the side of the vehicle so as to be viewable by the driver or occupant of a vehicle that is overtaking the host vehicle. The indicator mounting portion 124b thus directs illumination away from the driver of the vehicle so that the iconistic portions 136b and display area 128b may display a turn signal icon or the like for viewing by drivers of other vehicles.

Figure 5:
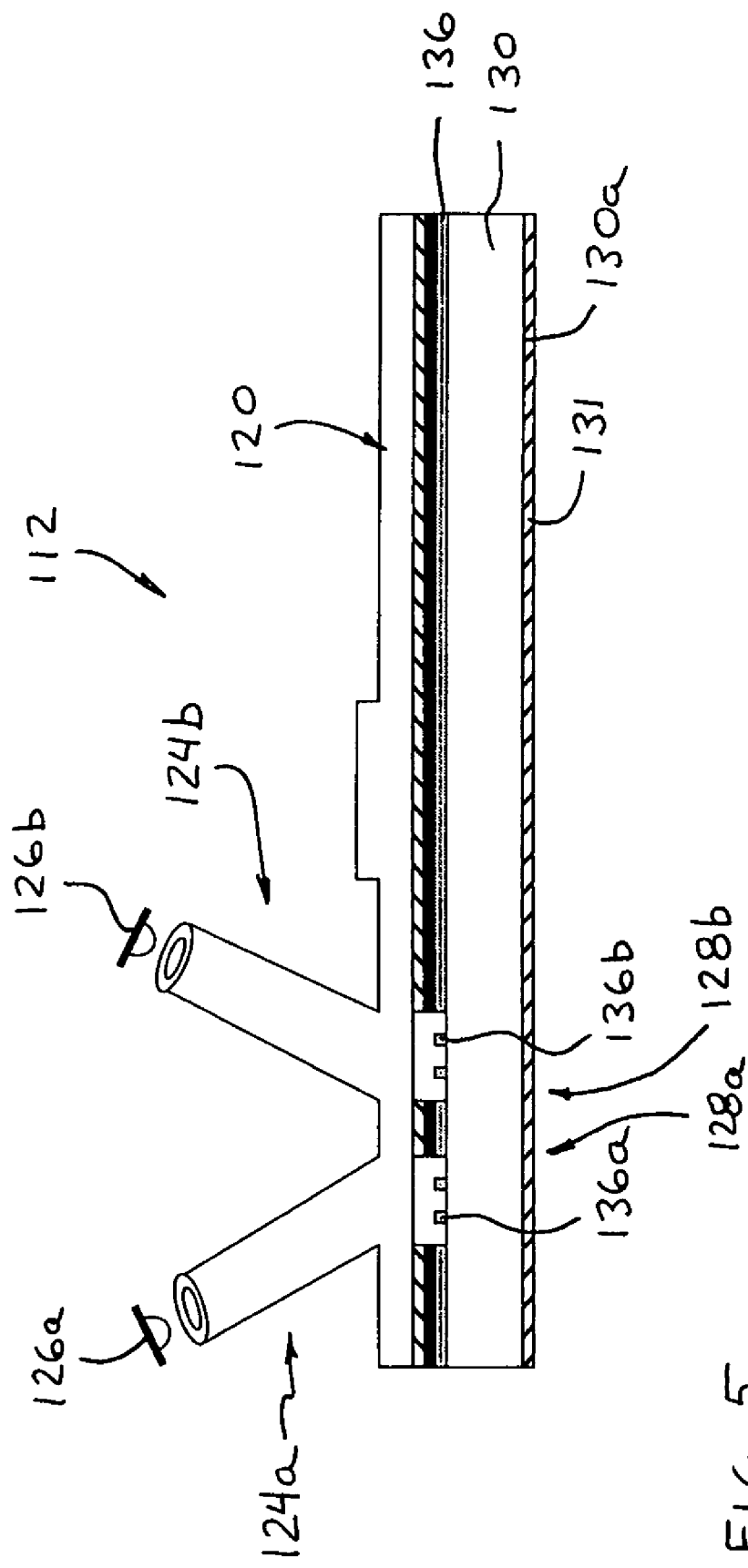
FIG. 5 is a partial sectional view of a portion of another mirror reflector sub-assembly of the present invention.

The back plate 120 and indicator mounting portions 124a, 124b and indicators 126a, 126b and mirror reflector sub-assembly 112 may be otherwise substantially similar to the back plates and indicator mounting portions and indicators and mirror reflector sub-assemblies described above, such that a detailed discussion of the mirror reflector sub-assemblies will not be repeated herein. The indicator mounting portions or extensions may be arranged side-by-side one another (such as shown in FIG. 5) or may be vertically staggered or offset or otherwise oriented or arranged at the back plate to position the indicator at the desired location and to direct the illumination at the desired angle through the respective iconistic portions and display areas established or defined at the reflective element.

Figure 6:
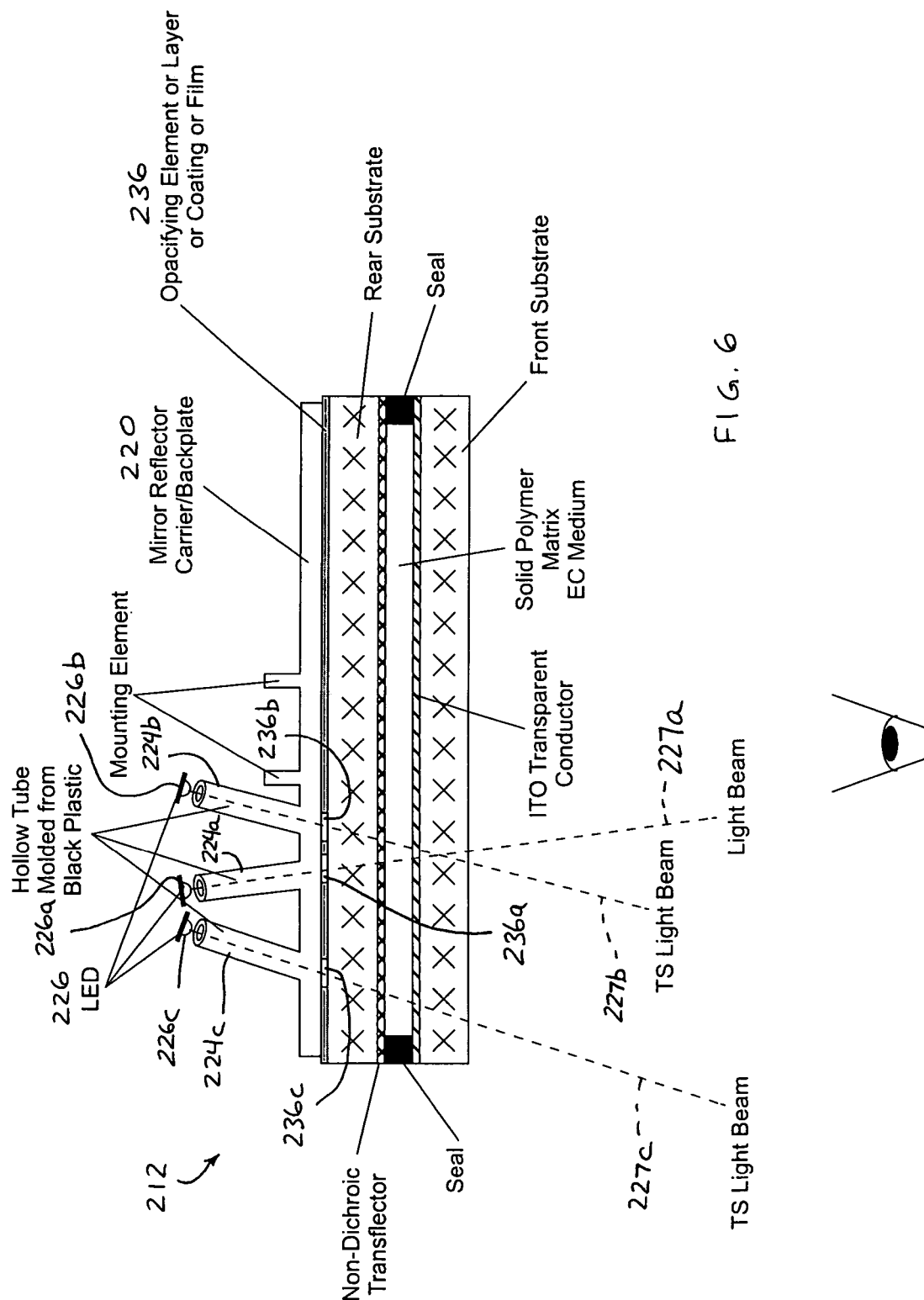
FIG. 6 is a partial sectional view of another mirror reflector sub-assembly of the present invention.

Optionally, and with reference to FIG. 6, a mirror reflector sub-assembly 212 includes a back plate 220 that is molded or formed with three hollow indicator mounting portions 224a, 224b, 224c and associated or respective illumination sources or LEDs 226. The indicator mounting portions 224a, 224b, 224c may be generally aligned with respective indicia portions 236a, 236b, 236c established in an opacifying element or layer or coating or film 236 sandwiched between the mirror reflector carrier or back plate 220 and the rear surface of the rear substrate 230 of the reflective element 218 (although not shown in FIG. 6, the mirror reflector sub-assembly may also include a heater pad as described above, without affecting the scope of the present invention). In the illustrated embodiment, one of the indicators 226a and indicator mounting portions 224a function as an object/LCA indicator and direct the principle beam axis 227a toward the driver of the host vehicle, while two of the indicators 226b, 226c and indicator mounting portions 224b, 224c function as turn signal indicators (or other indicators for indicating information to drivers of other vehicles, such as brake light indicators or hazard indicators or the like) and direct the principle beam axes 227b, 227c away from the host vehicle for viewing by the drivers of other vehicles alongside or overtaking the host vehicle. Optionally, the indicator mounting portion or tube 224a, or another similarly angled indicator mounting portion or tube, may be angled so as to direct the principle beam axis or axes toward the host vehicle for conveying other vehicle information to the driver of the host vehicle.

Figure 7:
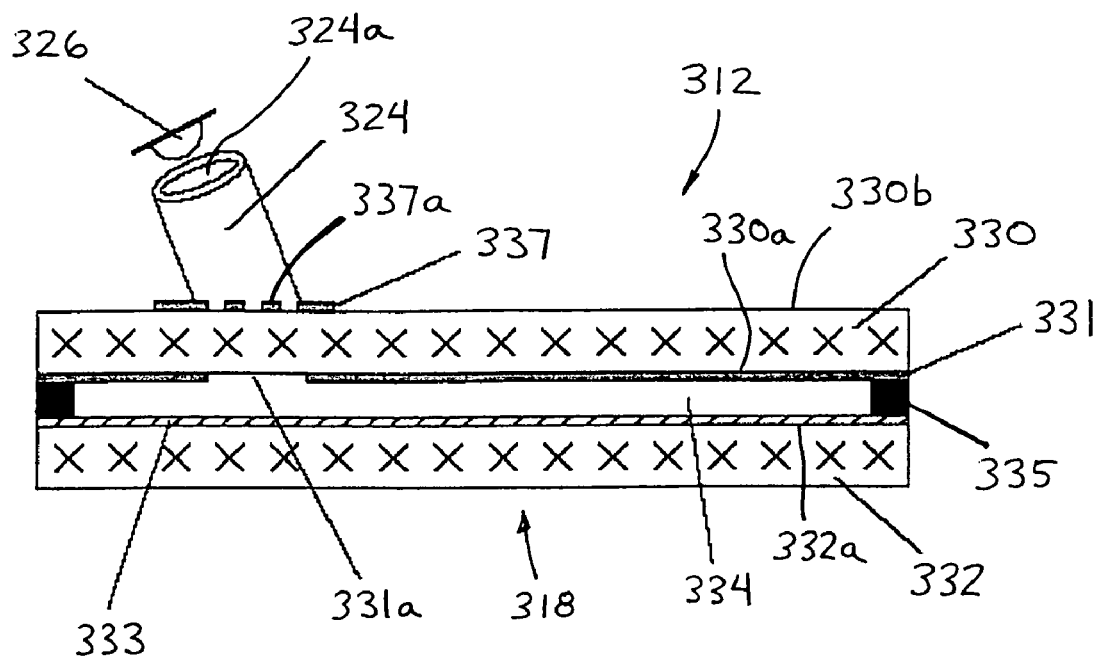
FIG. 7 is a sectional view of another mirror reflector sub-assembly of the present invention.

Optionally, and with reference to FIG. 7, a mirror reflector sub-assembly 312 includes a hollow indicator mounting portion or tube or extension 324 that may be attached to (such as by adhering or the like) the rear surface 330b of a rear substrate 330 of a reflective element 318. The indicator mounting portion 324 may be positioned at and attached to a mask 337 disposed at the rear surface 330b of rear substrate 330 and between the indicator mounting portion 324 and the rear surface 330b. The indicator mounting portion 324 comprises a hollow tube molded from a dark (such as black or dark blue or the like) plastic material, and receives or attaches to an indicator 326 at its end opposite the reflective element 318, so that illumination or light from the indicator 326 passes through a passageway 324a of indicator mounting portion 324, such as in a similar manner as described above. The mask 337 has indicia or icons 337a established therethrough so that illumination passing through the passageway of the indicator mounting portion passes through the holes or apertures formed in the mask so that the desired indicia or icon or symbol is viewable by a person viewing the reflective element.

The rear substrate 330 of reflective element 318 includes a metallic reflector or reflective coating or layer 331 disposed on its forward or third surface 330a, and further includes an electrochromic medium 334 (and perimeter seal 335) sandwiched between the metallic reflector 331 at the rear substrate 330 and a transparent conductive coating or layer 333 at a rear surface 332a of a front substrate 332. In the illustrated embodiment, the metallic reflective coating 331 is substantially reflective and may not comprise a transflective coating or layer. Thus, an aperture or hole 331a is formed or established through the metallic reflective coating or layer 331 and generally at or near the location at which the indicator mounting portion 324 and mask 337 are positioned or mounted. In such an embodiment, the reflective element 318 may not include an opacifying layer, whereby a separate mask may be disposed at the rear surface of the rear substrate to establish the icons or indicia for the indicator device.

Figure 8:
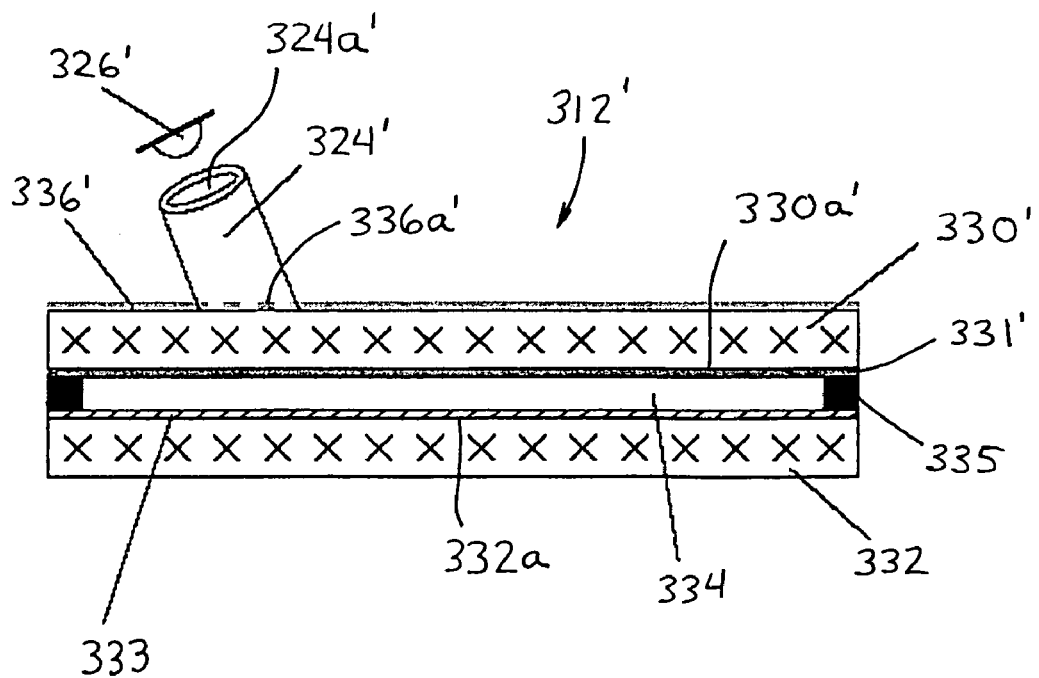
FIG. 8 is a sectional view of another mirror reflector sub-assembly of the present invention.

Optionally, and as shown in FIG. 8, a mirror reflector sub-assembly 312' includes an indicator mounting portion or hollow tube 324' and indicator 326' located at or attached or adhered to an opacifying layer 336' disposed at the rear surface 330a' of a rear substrate 330' of a reflective element 318', where the blind spot alert icon or indicia 336a' is established through the opacifying layer 336', such as in a similar manner as described above. In the illustrated embodiment, the rear substrate 330' includes a non-dichroic transflector or transflective coating or layer 331' disposed on its forward or third surface 330a', and further includes an electrochromic medium 334 (and perimeter seal 335) sandwiched between the transflector 331' and a transparent conductive coating or layer 333 at a rear surface 332a of a front substrate 332. In the illustrated embodiment, the transflective coating 331' is at least partially transmitting, and thus does not require an aperture or hole formed or established therethrough. The indicator mounting portion 324' comprises a hollow tube molded from a dark (such as black or dark blue or the like) plastic material, and receives or attaches to indicator 326' at its end opposite the reflective element 318', so that illumination or light from the indicator 326' passes through a passageway 324a' of indicator mounting portion, such as in a similar manner as described above. The opacifying layer 336' has indicia or icons 336a'established therethrough so that illumination passing through the passageway of the indicator mounting portion passes through the holes or apertures formed in the mask and passes through the reflective element so that the desired indicia or icon or symbol is viewable by a person viewing the reflective element.

The indicator mounting portions 324, 324' may be formed at the desired angle and may be adhered to or otherwise attached to the mask or the opacifying layer or the rear surface of the rear substrate or the like, whereby illumination from the associated indicator is guided in the desired or appropriate direction (such as generally toward the driver of the host vehicle for a blind spot alert indicator or generally away from the driver of the host vehicle for a turn signal indicator or the like) in a similar manner as described above. The plastic tube or tubes or indicator mounting portion/portions may be similar to the indicator mounting portions of the back plates discussed above, and may include light absorbing or substantially light absorbing means on or in or through or partially through the inner surface of the passageway defined along the tube, such that principally only light rays that pass substantially through the full length of the inner passageway exit the end of the light emitting passageway, whereby the light emitted by the light emitting source is mainly visible only by viewing axially along or substantially along the line of direction of the passageway. Optionally, the indicator mounting portions and indicators may be provided as an indicator module that is readily attached to the rear of the reflective element and electrically connected to the appropriate circuitry or wires of the mirror assembly.

The reflective elements 318, 318' may be otherwise substantially similar to the reflective elements described above, such that a detailed discussion of the reflective elements will not be repeated herein. The angle and direction of the indicator mounting portions may be selected depending on the particular associated display indicia or icons and on the particular mirror application. The reflector carrier or back plate (not shown in FIGS. 7 and 8) of the mirror reflector sub-assemblies may have an aperture or opening therethrough for at least partially receiving the indicator mounting portion or portions or hollow tube or tubes therethrough when the back plate is attached to the rear surface of the reflective element, whereby the hollow tube or tubes (and associated indicator or indicators) may protrude at least partially through the back plate when the mirror reflector sub-assembly is assembled. Optionally, the icons or displays of the mirror reflector sub-assemblies described herein may be established utilizing aspects of the icons or symbols or indicia described in U.S. pat.

Applications, Ser. No. 11/226,628, filed Sep. 14, 2005 by Karner et al. for MOUNTING ASSEMBLY FOR VEHICLE INTERIOR MIRROR; and/or PCT Application No. PCT/US2006/018567, filed May 15, 2006, which are hereby incorporated herein by reference in their entireties.

Optionally, the mirror reflector sub-assembly may include masks or baffles or light direction means or occluding means or directional filtering, such as louvers or shutters or filters or light directing film or the like, at the rear of the reflective element (such as between the back plate and the iconistic portions) for further directing or guiding the illumination from the illumination source at the desired angle and through the reflective element so as to be principally or solely viewable by the driver of the host vehicle (for blind spot/LCA applications) or so as to be principally or solely viewable by others at the side or rear of the vehicle (for turn signal applications).

Therefore, the present invention provides a back plate that includes one or more indicator mounting portions or display receiving portions integrally formed therewith, so that the display element or device may be readily assembled to the mirror reflector sub-assembly via attachment or adherence of the back plate to the mirror reflective element. The present invention thus provides a display element or device that is readily assembled to a mirror reflector sub-assembly, and thus facilitates assembly of the mirror reflector sub-assembly at a facility remote from the mirror assembly facility, such that the mirror reflector sub-assembly (including the back plate and indicator mounting portion) may be provided or supplied to the mirror manufacturer as a unit. The mirror manufacturer then may install or attach the indicator or indicator module to the indicator mounting or receiving portion (or may electrically connect an already installed indicator to a wire or lead of the mirror assembly), and may attach the mirror reflector sub-assembly to the mirror actuator. The present invention thus provides enhanced assembly processing of the mirror assembly, while taking advantage of the otherwise typically unused space within the casing and behind the back plate of the exterior rearview mirror assembly.

Although shown and described as being located at a driver side exterior mirror, the blind spot/LCA/turn signal indicator of the present invention may also or otherwise be located at the passenger side exterior mirror, if desired. Optionally, a blind spot indicator in accordance with the present invention may be located at both the driver side mirror assembly and the passenger side mirror assembly of the host vehicle. The indicator at either side may be selectively activated or illuminated to indicate to the driver of the host vehicle that an object or other vehicle has been detected at that particular side lane region of the host vehicle. Optionally, the blind spot indicator may be associated with a blind spot detection and indication system that includes one or more indicators at the interior rearview mirror assembly of the host vehicle. The blind spot indicators may utilize aspects of the blind spot indicators and/or blind spot detection systems described in U.S. Pat. Nos. 6,198,409; 5,929,786; and 5,786,772, and/or PCT Application No. PCT/US2006/026148, filed Jul. 5, 2006 by Donnelly Corp. et al. for VEHICLE EXTERIOR MIRROR ASSEMBLY WITH BLIND SPOT INDICATOR, which are hereby incorporated herein by reference in their entireties.

Such an indicator or indicators may function as a lane change assist (LCA) indicator or indicators and/or a blind spot indicator or indicators. Such blind spot indicators are typically activated when an object is detected (via a side object or blind spot detection system or the like such as described in U.S. Pat. Nos. 7,038,577; 6,882,287; 6,198,409; 5,929,786; and 5,786,772, and/or U.S. patent application, Ser. No. 11/315,675, filed Dec. 22, 2005 by Higgins-Luthman for OBJECT DETECTION SYSTEM FOR VEHICLE; and/or PCT Application No. PCT/US2006/026148, filed Jul. 5, 2006 by Donnelly Corp. et al. for VEHICLE EXTERIOR MIRROR ASSEMBLY WITH BLIND SPOT INDICATOR, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane.

Optionally, and alternately, the indicator or indicators may function as a lane change assist indicator or indicators, where the host vehicle may be detected to be moving into an adjacent lane without the turn signal being activated, and an object or vehicle may be detected at the adjacent lane, whereby the LCA indicator or indicators may be activated to provide an alert to the driver of the lane change to assist the driver in avoiding unintentional lane changes and/or lane changes when a vehicle or object is detected in the adjacent lane.

Optionally, and with reference to FIGS. 9 and 10, a mirror reflector sub-assembly 412 includes a mirror reflective element 418 and a mirror reflector carrier or back plate 420 attached to or mounted to or adhered to a rear surface 418a of mirror reflective element 418. The mirror reflector sub-assembly 412 includes a display device or display element 422 that is operable to provide a display or indication at the reflective element for viewing the display or indication through the mirror reflective element when the display device is electrically actuated. Display element 422 includes a light source 434, which is disposed at a display portion or a display mounting or attaching portion or display receiving portion or structure 430 (such as a corner portion or region, such as an upper outside/far quadrant or corner portion or region that is outboard of and separate from the reflective element so that light emitted by the light source or sources of the display element does not impinge on or pass through any portion of the reflective element 418, and is desirably at the outer or far side of the reflective element and away from the vehicle at which the mirror assembly is mounted) of the back plate 420 and is located at a perimeter region of the reflective element sub-assembly so as to be operable to emit light outside of the perimeter of the reflective element 418 and not through the reflective element 418, such as discussed below. Since the back plate itself is mounted on the mirror actuator, the back plate, reflective element and display element move in tandem when the mirror actuator is actuated to adjust the rearward field of view as reflected by the mirror reflective element.

Back plate 420 is molded or formed, such as by injection molding, so as to provide the display receiving portion 430 and a generally planar backing portion 420a that attaches to the rear surface 418a of the reflective element 418 (such as via adhesive or other suitable attachment means). Preferably, back plate 420, including display receiving portion 430, is molded of a substantially dark or opaque or black material, such as from an ABS or polycarbonate polymeric resin material or from any other suitable material such as known in the exterior rearview mirror art, so as to be substantially opaque such that light does not pass through the opaque back plate and display receiving portion. An attachment element or elements 420b may be formed or established at the rear of the backing portion 420a for attaching the back plate 420 and reflective element to a mirror actuator, such as a mirror actuator as known in the art and/or as described in U.S. Pat. Nos. 7,080,914; 7,073,914; 6,916,100; 6,755,544; 6,685,864; 6,467,920; 6,362,548; 6,243,218; 6,229,226; 6,213,612; 5,986,364 and 5,900,999, which are hereby incorporated herein by reference herein in their entireties.

Optionally, a heater pad 437 may be provided at the rear surface 418a of the reflective element 418 and between the backing portion 420a of back plate 420 and the reflective element 418 to provide an anti-fogging of de-fogging feature to the exterior mirror assembly (such as by utilizing aspects of the heater elements or pads described in U.S. patent application Ser. No. 11/334,139, filed Jan. 18, 2006 by Byers et al. for MIRROR ASSEMBLY WITH HEATER ELEMENT, now U.S. Pat. No. 7,400,435, which is hereby incorporated herein by reference in its entirety). The back plate and/or heater pad may include suitable electrical connectors and connections incorporated therein (such as by utilizing aspects of the mirror assembly described in U.S. patent application Ser. No. 11/334,139, filed Jan. 18, 2006 by Byers et al. for MIRROR ASSEMBLY WITH HEATER ELEMENT, now U.S. Pat. No. 7,400,435, which is hereby incorporated herein by reference in its entirety) for electrically connecting the heater pad and/or display element (or other suitable electrical connectors may be utilized, such as electrical leads or wire harnesses or pigtails or other separate connectors or cables or the like).

Back plate 420 may include a perimeter framing portion or bezel portion 420c that extends around the perimeter edges of the reflective element 418 to support the reflective element and flame the reflective element at the mirror assembly. The perimeter bezel portion may be narrow or small depending on the particular application of the reflective element and mirror reflector sub-assembly. Optionally, the mirror reflector sub-assembly may comprise a bezelless or frameless reflective element (such as the types described in U.S. patent applications, Ser. No. 11/226,628, filed Sep. 14, 2005; Ser. No. 10/533,762, filed May 4, 2005, now U.S. Pat. No. 7,184,190; and/or Ser. No. 11/021,065, filed Dec. 23, 2004, U.S. Pat. No. 7,255,451, and/or PCT Application No. PCT/US2006/018567, filed May 15,2006 by Donnelly Corp. et al., which are hereby incorporated herein by reference in their entireties), whereby the back plate may not include a perimeter framing portion or bezel portion around the perimeter of the reflective element.

Optionally, and as shown in phantom in FIG. 10, the bezel portion 420c may include a lip or tab or shelf 420d at a portion thereof. The lip 420d protrudes forward of the bezel portion and over a portion of a forward surface of the reflective element when the reflective element is attached to the back plate. Thus, the reflective element and heater pad may be inserted or loaded into the back plate by inserting a perimeter region of the reflective element into the back plate and under or behind the tab 420d and pivoting the reflective element into position whereby the reflective element is at least partially recessed within the frame or bezel portion of the back plate.

In the illustrated embodiment, display receiving portion 430 of back plate 420 is formed or established or disposed at the outer and upper corner of the reflective element sub-assembly 412 so as to be readily viewable by drivers of other vehicles at the side of or rearward of the host vehicle, while not unduly interfering with the primary rearward field of view of the driver of the host vehicle via the mirror reflector of the mirror reflective element. As shown in FIGS. 9 and 10, display receiving portion 430 may be received at a corner region or cut-out region of the reflective element 418 so as to be viewable outside of the reflective element and not through the reflective element. The size and shape of the display receiving portion and display area may be selected depending on the particular application of the mirror reflector sub-assembly, and may be nested in a corner region of the mirror reflective element (or could be located along a side region, such as the outer or inner side region of the reflective element, or an upper or lower region of the reflective element), and may be formed to have a reduced or minimum size or footprint at the perimeter or corner of the reflective element.

Thus, because the display element is separate from the reflective element and does not project or emit light through the reflective element (so that light emitted by the light source and emanating from the display element does not pass through the reflective element before exiting the mirror sub-assembly), the mirror reflector manufacturer does not have to specially modify the mirror reflector of the reflective element, such as by creating apertures or windows in the reflective coating or reflector or by making the reflector a transflective or transreflective mirror reflector. Thus, the mirror reflector may comprise a mirror reflector that does not require any etching or removal of the reflector coating and does not require any special coatings that may provide a transmissive function as well as a reflective function. Such a mirror assembly and display is thus in stark contrast to known mirror assemblies with through-the-glass displays such as the types described in U.S. Pat. Nos. 5,788,357 and 6,700,692, which are hereby incorporated herein by reference in their entireties.

As shown in FIG. 10, a rear surface 430a of display receiving portion 430 may be angled or canted or slanted and may receive or support display element 422 thereat. For example, rear surface 430a may receive and support a circuit board or circuit element 432 (such as a printed circuit board or the like) thereat or thereon, while a front surface 430b of display receiving portion 430 may be generally flush with the front or outer surface 418b of the reflective element 418 (the surface that faces rearward when the mirror assembly is mounted at the vehicle). Circuit element 432 is thus located at the rear surface 430a of display receiving portion 430 and includes or supports one or more illumination sources or light sources or indicators 434 (preferably light emitting diodes (LEDs) or the like, which emit or project light through display receiving portion 430, such as via one or more passageways 430c formed or established through display receiving portion 430. The LEDs 434 may be received at a recess or rearward end of the passageways 430c so that light emitted by the LEDs 434 is directed along the passageways 430c and through the display receiving portion 430 and not through the reflective element 418.

In the illustrated embodiment, the passageways 430c are angled through display receiving portion 430 and are generally normal to circuit element 432. As can be seen in FIG. 10, the passageways 430c are angled outward and away from the reflective element and thus away from the host vehicle and away from the driver of the host vehicle. The illumination sources or LEDs 434 are located at circuit element 432 and at or near the end of passageways 430c so that light 434a emitted by LEDs 434 is emitted through passageways 430c and away from the view of the driver of the host vehicle sitting in the vehicle cabin. The angle of the rear surface and/or the passageways may be selected to provide the desired angle of the light path as the light exits the display receiving portion, depending on the particular application of the display device and reflective element sub-assembly. The passageways or slots may be established to provide the desired indicator form or shape, such as a chevron shape or arrowhead shape or other suitable shape or form (such as five or seven individual segments or indicating elements (or more or less) that are configured and/or arranged to form the selected icon or chevron shape or arrow shape or the like), and may be readily viewable and discernible and recognizable when the indicators or LEDs are activated. Because the back plate 420 and display receiving portion 430 of back plate 420 are substantially opaque, the passageways and indicators are not readily viewable and discernible when the indicators or LEDs are deactivated.

Although shown and described as having hollow passageways, it is envisioned that the display receiving portion may include tubes or pipes through the display portion, whereby light emitted by the light sources passes through the tubes or pipes disposed at or in or through the display receiving portion. Also, although shown and described as having hollow passageways, it is envisioned that the display receiving portion may be filled with a transparent light conducting material or optical plastic, such as polycarbonate or acrylic or acrylate or polystyrene or COC olefin or the like, or other suitable optical medium, such as via co-injection molding of such materials, whereby light emitted by the light sources passes through the optical medium of the display receiving portion. The light conducting passageways or light pipes or light tubes or light conducting material may be configured to provide the desired or appropriate icon or display, and may provide a solid arrow display (or other suitable solid shape) or may provide a series of individual holes or apertures or pipes or tubes or the like that combine to form an arrow (or other suitable shape), while remaining within the spirit and scope of the present invention. It is further envisioned that if the passageways are filled or partially filled with a light conducting material or other optical medium, the passageways would not be open at the exterior end of the passageways and thus, the light conducting material would limit or substantially preclude dirt or debris or water or other environmental elements from entering or blocking the passageways, whereby a cover plate (discussed below) may not be needed at the outer surface of the display element.

Thus, the back plate of the mirror sub-assembly may be molded or formed to include the display portion at its upper far corner or quadrant (or elsewhere as desired) so that the display receiving portion is outside of the glass or reflective element and thus does not provide a "through-the-glass" turn signal indicator (such as the through-the-glass types of indicators described in U.S. Pat. Nos. 5,788,357 and 6,700,692, which are hereby incorporated herein by reference in their entireties). The molded display receiving portion is angled with correspondingly angled holes or passageways or slots that form or establish the desired shape of the indicator. Optionally, the display element or device may include a fight directing film and/or a polarizing film to direct/modify the light emitted by the LEDs along the passageways or slots through the display receiving portion of the back plate, such as by utilizing aspects of the display devices described in U.S. provisional applications, Ser. No. 60/732,245, filed Nov. 1, 2005; Ser. No. 60/759,992, filed Jan. 18,2006; and Ser. No. 60/836,219, filed Aug. 8,2006 by Weller et al. for INTERIOR REARVIEW MIRROR ASSEMBLY WITH DISPLAY; and/or U.S. patent applications, Ser. No. 10/993,302, filed Nov. 19,2004, now U.S. Pat. No. 7,338,177; and/or Ser. No. 11/226,628, filed Sep. 14,2005 by Karner et al. for MOUNTING ASSEMBLY FOR VEHICLE INTERIOR MIRROR, and/or PCT Application No. PCT/US2006/018567, filed May 15,2006; and/or U.S. Pat. No. 7,083,312, which are hereby incorporated herein by reference in their entireties.

Optionally, the display element (preferably comprising a stand-alone unitary module that is substantially sealed so as to be substantially impervious to water ingress or to debris ingress, and most preferably with electrical connectors (such as a plug or socket connector) established or incorporated therein or with a lead or wire harness (such as a flying lead or pigtail) established or incorporated therein), including the light source and circuitry, may be supplied or provided to an assembly facility (such as a mirror assembly facility or the like) from a display element supplier, while the back plate may be molded and supplied or provided to the assembly facility from a back plate supplier. An operator at the assembly facility may attach the display device and/or circuitry to the back plate (such as to the rear surface of the display receiving portion of the back plate), preferably by snapping the display device or module to snaps or clips or clasps or fingers or the like molded into the back plate (at its display element receiving portion) to assemble the display or indicator to the back plate. Optionally, and desirably, the display receiving portion of the back plate and/or the display element (such as at the circuit element or circuit board) may have attaching elements or snaps or clips or prongs to ease the assembly and securement of the display element to the display receiving portion of the back plate so that an operator may attach the display element to the back plate via a snap connection or attachment.

Optionally, and desirably, electrical connection (such as to a power supply or 12 volt power wire of the vehicle battery/ ignition system or to a power feed from a LIN bus controller) to the display circuitry may be made when the display element is snapped or otherwise attached (preferably mechanically but optionally adhesively) to the back plate, such as by making electrical contact between the display element and mirror circuitry (including circuitry associated with the reflective element and/or mirror assembly, such as electrochromic mirror circuitry, mirror lights and/or display circuitry and the like, typically disposed at a printed circuit board of the mirror assembly) when the display element is snapped to the back plate, such as via pressed contact or connection between respective electrical terminals or contacts of the display element and mirror circuitry as the display element is pressed or snapped or received to the display receiving portion of the back plate, such as by press attaching the display element or module into receiving fingers or clips or snaps or the like that are integrally formed with the display receiving portion of the back plate in the injection molding operation that manufactures or forms the back plate itself. For example, electrical terminals or contacts may be insert molded in the display receiving portion so as to be exposed at (or otherwise located at) the rear surface of the display receiving portion for electrical connection to the display element when the display element is attached or snapped to the display receiving portion of the back plate. Alternately, electrical connection to the display device may be made via other means, such as wires or leads or flying leads or wire harnesses or the like such as pigtails or other suitable connectors or leads, and before or after the display device is snapped or otherwise attached to the back plate, while remaining within the spirit and scope of the present invention.

Thus, a method of assembling such a mirror reflective element sub-assembly may include molding the back plate having a display receiving portion and providing the back plate and reflective element to an assembly facility, while also providing a display element or module at the assembly facility. Preferably, the display element and the back plate are supplied or provided to the assembly facility from different sources. An operator at the assembly facility takes a back plate and a display element and snaps the display element to the rear surface of the display receiving portion of the back plate to attach and secure the display element at the display receiving portion. The operator also makes the electrical connection between circuitry or wiring of the mirror assembly or sub-assembly and the display element, either as the display element is snapped to the display receiving portion of the back plate (such as via contacts at the display element and display receiving portion of the back plate) or at a separate time from the attachment of the display element to the back plate (such as via separate connectors at or extending from the display element). Optionally, electrical connection to the display element may be made during assembly of the reflective element sub-assembly to the mirror casing of the mirror assembly (such as via connectors or leads or pigtails extending from the display element).

Optionally, and with reference to FIGS. 11 and 12, a display element or device 422' of a mirror reflective element sub-assembly 412' is operable to provide a display or indication at the reflective element for viewing the display or indication through the mirror reflective element. Display device 422' is disposed at a display receiving portion 430' (such as a corner portion or region, such as an upper outside/far quadrant or corner portion or region that is at the outer side of the reflective element and away from the vehicle at which the mirror assembly is mounted) of the back plate 420' and is located at a perimeter region of the reflective element sub-assembly so as to be operable to emit light outside of the perimeter of the reflective element 418' and not through the reflective element 418', such as in a similar manner as described above.

As shown in FIG. 12, display device 422' includes a light control film 436' established or disposed between the rear surface 430a' of display receiving portion 430' and the LEDs 434' and circuit element 432'. For example, the light control film 436' may be disposed or adhered otherwise attached at the rear surface 430a' so that light 434a' that is emitted by LEDs 434' is directed through the light control film 436' and through the passageways 430c' established through display receiving portion 430'. Light control film 436' may comprise any suitable film and may function as microlouvers, so as to preferentially direct light that is received from one angle whereby the light is redirected or controlled to another direction (such as the films of the types described in PCT Application No. PCT/US2006/018567, filed May 15, 2006, which is hereby incorporated herein by reference in its entirety). An example of a suitable light control film or material is disclosed in U.S. Pat. No. 5,481,409 (which is hereby incorporated herein by reference in its entirety), and may comprise a light control film manufactured by the 3M Company of Minn., such as the light control film commercially available under the trade name LCF-P (light control film - polycarbonate).

Such a film comprises a thin plastic film enclosing a plurality of closely spaced, light black colored microlouvers. A preferred light control film is approximately 0.75 mm thick or thereabouts, and the angled microlouvers are spaced approximately 0.127 mm apart. The microlouvers may be in various angular positions to provide a particular viewing angle, such as from as narrow as about a 48 degree angle to as wide as about a 90 degree angle, depending on the desired angle of the microlouvers for the particular application for angling/directing the light in a desired or appropriate direction or angle. Thus, the light control film controls or directs the light 434a' emitted by the illumination sources or LEDs 434' along a desired or appropriate or predetermined angle with respect to front surface 430b' of display receiving portion 430' and the mirror substrate or reflective element 418', and helps assure that the driver of the host vehicle is largely unaware or not bothered by actuation of the turn signal indicating light sources.

The likes of a 3M Light Control Film comprises a thin plastic film containing closely spaced dark or black or light absorbing microlouvers. When used as described herein, the film simulates a tiny Venetian blind, wherein the microlouvers allow for controlled transmission of the light emitted by the indicator light sources (that are disposed behind the transflective mirror element) along the axis of the microlouvers so that the light is seen by drivers overtaking the host vehicle in a side-lane blind spot area but the line of sight from the driver of the host vehicle to the turn signal indicator's emitted light beam is substantially blocked by the microlouvers. Examples of light directing or regulating filters or baffle assemblies can be found in U.S. Pat. Nos. 4,906,085 and 5,313,335, the entire disclosures of which are hereby incorporated by reference herein.

Optionally, and typically, the light control film may have its microlouvers at an angle of about zero degrees (i.e., generally perpendicular to the plane of the light control film) so as to direct the principle beam axis of the light emitted by the illumination sources at the desired or appropriate angle established by the angling of the rear surface of the display receiving portion relative to its front surface and so as to have the light beam emitted by the light sources pass through the display receiving portion to exit at the desired or set or selected angle. Placement of the light control film on the angled rear surface of the display receiving portion is advantageous when the light control film (such as 3M's Vikuiti™ ALCF-P or LCF-P) is used where the louver angle is zero degrees and where on-axis vertically incident light from the light sources is highly transmitted but where off-axis light is cut-off by the embedded microlouvers. Such zero degree louvered light control film is used for privacy filters for laptop computer screens and ATM screens, and so is economically available. By being able to purchase and use zero angle louvered light control film, and by using the likes of an angled rear surface (pre-established via molding of the mirror back plate at its display receiving portion) to support the light control film at an angle in front of the light sources that are similarly angled and supported, economical assembly can be enhanced. Optionally, and alternatively, a mechanical support to mutually support and angle the light control film/light sources relative to the plane of the rear of the mirror reflective element may be used so that light emitted by the light sources is generally aligned with or on-axis with the light transmission axis between the louvers, and so that the light beam passed through the light control film has its principal beam axis directed in the desired or appropriate direction, such as in a direction generally away (for a turn signal indicator) from the vehicle body side and away from direct view by a driver of the host vehicle to which the exterior mirror reflective element is attached, or such as in a direction generally toward (for a blind spot indicator) the vehicle body side for direct viewing by the driver of the host vehicle and away from direct view by a driver of another vehicle.

As shown in FIG. 12, display device 422' further includes a light transmitting lens cover or cover element 438' that covers and substantially seals the passageways 430c' at the front surface 430b' of display receiving portion 430' to limit or substantially preclude dirt, debris, water and other elements and/or contaminants from being received at the outer ends of the passageways so as to keep the passageways clear and to protect and seal the electronic circuitry at the rear of the display portion. Cover element 438' may comprise a substantially transparent or clear cover element or may be tinted (such as red-tinted or amber-tinted) to provide a desired or appropriate color or tint to the light passing therethrough. Optionally, one or more diffusers or diffusing elements may be incorporated in the cover element or incorporated into the indicator or light module so as to provide a covered and/or tinted and/or diffused display at the mirror sub-assembly.

As can be seen with reference to FIGS. 11 and 12, cover element 438' may comprise a desired shape or form, such as a triangular form or shape or arrow shape or the like, while the LEDs 434' and passageways 430c' may function to illuminate the cover element 438'. Optionally, the cover element 438' may comprise an optical lens element with light directing properties configured to direct the light passing therethrough away from or further away from the body-side of the host vehicle so as to be generally not viewable by the driver of the host vehicle. Optionally, cover element 438' may be countersunk or received in a recess 430d'formed or established at the front surface 430b' of display portion 430' (for example the cover element may be molded or snapped into the recess). The display device thus is substantially water sealed and substantially water impervious and substantially impervious to dirt and debris and other environmental elements that the reflective element sub-assembly may typically encounter. Thus, the display device and back plate may be provided as a self-contained sealed module (or may be readily assembled to form a self-contained sealed module), and may have electrical connectors for electrically connecting the module to electrical connectors of the mirror assembly and/or of a vehicle wire harness or the like.

Thus, the back plate may be readily molded or formed with holes or apertures or passageways through its display receiving portion, and a cover element may be attached at the outer surface of the display receiving portion to substantially seal the passageways to limit or substantially preclude water intrusion and/or dirt or debris intrusion into the passageways. The snapping of the cover element at the display receiving portion thus forms a substantially tight fit over the passageways to substantially seal the passageways. Optionally, the cover element may partially plug or fill the passageways in a sealing manner (and/or a separate sealing material or element may be disposed between the cover and the display receiving portion to partially plug or fill the passageways), while providing for light transmission through the passageways and through the cover element. Preferably, the cover element may snap or otherwise mechanically attach to the display receiving portion to substantially seal the passageways as the mirror sub-assembly is formed and/or assembled.

The angle of the rear surface 430a' of display portion and/or of the passageways 430c', and of the microlouvers or other optical guiding elements, may be selected to provide the desired angle of the light path as the light exits the display portion and passes through the cover element 438', depending on the particular application of the display device and mirror reflective element sub-assembly. Mirror reflective element sub-assembly 412' may otherwise be substantially similar as mirror reflective element sub-assembly 412 described above, such that a detailed discussion of the mirror reflective element sub-assemblies need not be repeated herein. The common or substantially similar components of the sub-assemblies not specifically discussed with respect to FIGS. 11 and 12 are shown in the FIGS. 11 and 12 with the same reference numbers as used in FIGS. 9 and 10.

Optionally, and with reference to FIGS. 13 and 14, a display element or device 422" of a mirror reflective element sub-assembly 412" is operable to provide a display or indication at the reflective element for viewing the display or indication through the mirror reflective element. Display device 422" is disposed at a display receiving portion 430" (such as a corner portion or region, such as an upper outside/far quadrant or corner portion or region that is at the outer side of the reflective element and away from the vehicle at which the mirror assembly is mounted) of the back plate 420" and is located at a perimeter region of the reflective element sub-assembly so as to be operable to emit light outside of the perimeter of the reflective element 418" and not through the reflective element 418", such as in a similar manner as described above.

In the illustrated embodiment of FIGS. 13 and 14, display receiving portion 430" has a rear surface 430a " that is generally parallel to front surface 430b " and to the front surface of the reflective element 418". Display receiving portion 430" includes one or more curved passageways 430c " established therethrough for guiding and directing light emitted by illumination sources or LEDs 434" so that the emitted light 434a" is directed outward and away from the body side of the host vehicle. The circuitry element 432" and LEDs 434" may be located or established at the rear surface of the display receiving portion in a similar manner as described above with respect to display device 422, or optionally may include a light control film such as described above with respect to display device 422', while remaining within the spirit and scope of the present invention. Further, the display device may include a light transmitting lens cover or cover element 438" at a front surface 430b " of display receiving portion 430", such as a cover element that substantially covers and seals the front surface of the display receiving portion and the passageways, such as in a similar manner as described above with respect to display device 422'.

Thus, the curved passageways 430c " of opaque display receiving portion 430" function to curve or direct the light 434a " emitted by the LEDs 434" in the desired or appropriate direction as the light passes through the cover element 438", so that the light 434a " is directed generally away from the body side of the host vehicle and is not readily viewable by the driver of the host vehicle. The LEDs 434" and circuit element 432" thus may be located at a flat or non-angled or non-canted rear surface 430a" of display receiving portion 430", whereby the curved passageways 430c" provide the desired guidance and directing of the light emitted by the LEDs 434". The angle of curvature of the passageways may be selected to provide the desired angle of the light path as the light exits the display portion and passes through the cover element 438". Mirror reflective element sub-assembly 412" may otherwise be substantially similar as mirror reflective element sub-assembly 412 or 412' described above, such that a detailed discussion of the mirror reflective element sub-assemblies need not be repeated herein. The common or substantially similar components of the sub-assemblies not specifically discussed with respect to FIGS. 13 and 14 are shown in the FIGS. 13 and 14 with the same reference numbers as used in FIGS. 9 and 10.

In the illustrated embodiments of FIGS. 9-14, the mirror sub-assembly includes a display device for a turn signal indicator (with the light beam projected by or emanating from the display device being directed away from the vehicle as it exits the mirror element sub-assembly and away from direct view of the driver of the host vehicle so that the driver is not unduly bothered by glare from the light sources at night), but the mirror sub-assembly could also or otherwise include a display device for a blind spot detection system or LCA system (where the passageways may be angled to emit light generally toward the vehicle so as to be readily viewable by the driver of the host vehicle so the driver principally sees the light emanating from the indicator while the light is not directly viewed by drivers of other vehicles). Optionally, the mirror assembly could include two display devices for providing both a display for a blind spot/LCA indicator and a display for a turn signal indicator, while remaining within the spirit and scope of the present invention.

For example, and with reference to FIGS. 15 and 16, a mirror reflective element sub-assembly 512 includes a mirror reflective element 518 and a mirror reflector carrier or back plate 520 attached to or mounted to or adhered to a rear surface 518a of mirror reflective element 518. The mirror reflector sub-assembly 512 includes a display element or device or blind spot indicating device 522 that is operable to provide a display or indication at the reflective element for viewing the display or indication through the mirror reflective element, such as in a similar manner as described above. Display element or device 522 is disposed at a display receiving portion 530 (such as a corner portion or region, such as a lower inside/near quadrant or corner portion or region that is at the inner side of the reflective element and toward the body side of the host vehicle at which the mirror assembly is mounted) of the back plate 520 and is located at a perimeter region of the reflective element sub-assembly so as to be operable to emit light outside of the perimeter of the reflective element 518 and not through the reflective element 518.

Back plate 520 is molded or formed so as to provide the display receiving portion 530 and a generally planar backing portion 520a that attaches to the rear surface of the reflective element (such as via adhesive or other suitable attachment means). Preferably, back plate 520, including display receiving portion 530, is molded of a substantially dark or opaque or black material so as to be substantially opaque such that light does not pass through the opaque back plate and display portion. An attachment element or elements 520b may be formed or established at the rear of the backing portion 520a for attaching the back plate 520 and reflective element to a mirror actuator, such as a mirror actuator as known in the art and/or as described in U.S. Pat. Nos. 7,080,914; 7,073,914; 6,916,100; 6,755,544; 6,685,864; 6,467,920; 6,362,548; 6,243,218; 6,229,226; 6,213,612; 5,986,364 and 5,900,999, which are hereby incorporated herein by reference herein in their entireties.

Optionally, a heater pad 537 may be provided at the rear surface 518a of the reflective element 518 and between the backing portion 520a of back plate 520 and the reflective element to provide an anti-fogging of de-fogging feature to the exterior mirror assembly (such as by utilizing aspects of the heater elements or pads described in U.S. patent application Ser. No. 11/334,139, filed Jan. 18, 2006 by Byers et al. for MIRROR ASSEMBLY WITH HEATER ELEMENT, now U.S. Pat. No. 7,400,435, which is hereby incorporated herein by reference in its entirety). Back plate 520 may include a perimeter framing portion or bezel portion 520c that extends around the perimeter edges of the reflective element 518 to support the reflective element and frame the reflective element at the mirror assembly.

Display receiving portion 530 of back plate 520 is formed or established at the inner and lower corner or quadrant of the reflective element sub-assembly 512 so as to be readily viewable by the driver of the host vehicle. As shown in FIGS. 15 and 16, display receiving portion 530 may be received at a corner region or cut-out region of the reflective element 518 so as to be viewable outside of the reflective element and not through the reflective element. As shown in FIG. 16, a rear surface 530a of display receiving portion 530 may be angled or canted or slanted and may receive or support a circuit board or element 532 thereat or thereon, while a front surface 530b may be generally flush with the front or outer surface 518b of the reflective element (the surface that faces rearward when the mirror assembly is mounted at the vehicle). Circuit element 532 includes one or more illumination sources or LEDs 534 that emit light along and through passageways 530c established through display receiving portion 530, such as in a similar manner as described above.

As shown in FIG. 16, display element or device 522 includes a light control film 536 (such as a light control film of the types described above with respect to display element 422') established or disposed between the rear surface 530a of display receiving portion 530 and the LEDs 534 and circuit element 532. For example, the light control film 536 may be disposed or adhered otherwise attached at the rear surface 530a so that light 534a that is emitted by LEDs 534 is directed through the light control film 536 and through the passageways 530c established through display receiving portion 530.

Light control film 536 may comprise any suitable film and may function as microlouvers, so as to preferentially direct light that is received from one angle whereby the light is redirected or controlled to another direction (such as the films of the types described in PCT Application No. PCT/US2006/018567, filed May 15, 2006, which is hereby incorporated herein by reference in its entirety). An example of a suitable light control film or material is disclosed in U.S. Pat. No.5,481,409 (which is hereby incorporated herein by reference in its entirety), and may comprise a light control film manufactured by the 3M Company of Minn., such as the light control film commercially available under the trade name LCF-P (light control film - polycarbonate), such as discussed above.

Further, display device 522 includes a light transmitting lens cover or cover element 538 that covers and substantially seals the passageways 530c at the front surface 530b of display receiving portion 530 to limit or substantially preclude dirt, debris, water and other elements and/or contaminants from being received at the outer ends of the passageways so as to keep the passageways clear and to protect and seal the electronic circuitry at the rear of the display portion. The cover element thus may seal or substantially seal the display element and display receiving portion to make the display device substantially water impervious and substantially impervious to other elements, such as dirt, debris and the like. Cover element 538 may comprise a substantially transparent or clear cover element or may be tinted (such as red-tinted or amber-tinted) to provide a desired or appropriate color or tint to the light passing therethrough. As can be seen with reference to FIGS. 15 and 16, cover element 538 may comprise a desired shape or form, such as a triangular form or shape or other suitable indicating shape or the like, while the LEDs 534 and passageways 530c may function to illuminate and project light through the cover element 538. Optionally, the cover element 538 may comprise an optical lens element with light directing properties configured to direct the light passing therethrough away from the body-side of the host vehicle so as to be generally not viewable by the driver of the host vehicle. Optionally, cover element 538 may be received in a recess 530d formed or established at the front surface 530b of display receiving portion 530. The angle of the rear surface 530a of display portion and/or of the passageways 530c, and of the microlouvers or other optical guiding elements, may be selected to provide the desired angle of the light path as the light exits the display receiving portion and passes through the cover element 538, depending on the particular application of the display device and mirror reflective element sub-assembly.

In the illustrated embodiment, the passageways 530c are angled through display receiving portion 530 and are generally normal to circuit element 532. As can be seen in FIG. 16, the passageways 530c are angled inward and toward the host vehicle and toward the driver of the host vehicle. The illumination sources or LEDs 534 are located at circuit element 532 and at or near the end of passageways 530c so that light 534a emitted by LEDs 534 is emitted through passageways 530c and toward the view of the driver of the host vehicle sitting in the vehicle cabin. The angle of the rear surface and/or the passageways may be selected to provide the desired angle of the light path as the light exits the display receiving portion, depending on the particular application of the display device and reflective element sub-assembly. The passageways or slots may be established to provide the desired indicator form or shape (such as an alert or warning shape or other suitable shape or form), and may be readily viewable and discernible and recognizable when the indicators or LEDs are activated. Because the back plate 520 and display receiving portion 530 of back plate 520 are substantially opaque, the passageways and indicators are not readily viewable and discernible when the indicators or LEDs are deactivated.

Thus, the blind spot indicator or display element or device 522 provides an indication of a detection of an object or vehicle in the "blind spot" of the host vehicle (such as at the driver side of the vehicle and partially rearward of the vehicle). The blind spot indicator 522 thus may provide an alert or indication (via activation of the LEDs 534) to alert the driver of the vehicle as to the detected presence of an object or vehicle in the adjacent lane, such as may be detected by such systems including a radar detector or an ultrasonic detector or a camera detector or the like. The blind spot indicator device may be operable in conjunction with any suitable side object detection system or blind spot alert system or the like, such as by utilizing aspects of the systems and/or devices discussed below. Optionally, the mirror reflective element sub-assembly 512 may also include a turn signal indicator at an outer corner or quadrant of the reflective element, such as described above.

Optionally, and with reference to FIGS. 17 and 18, a display element or device 622 of a mirror reflective element sub-assembly 612 includes a turn signal indicating element or device 622a and a blind spot indicating element or device 622b for providing both a turn signal indicator and display area or icon or indicator 623a and an object in a blind spot/LCA indicator and display area or indicator 623b, respectively. Display device 622 is disposed at a display receiving portion 630 (such as a corner portion or region, such as an upper outside/far quadrant or corner portion or region that is at the outer side of the reflective element and away from the body side of the host vehicle at which the mirror assembly is mounted) of the back plate 620 and is located at a perimeter region of the reflective element sub-assembly so as to be operable to emit light outside of the perimeter of the reflective element 618 and not through the reflective element 618. As can be seen in FIG. 18, display device 622a is angled outward so as to direct illumination or light outward and away from the body side of the host vehicle for displaying a turn signal indicator, such as in a similar manner as described above with display devices 422, 422', 422", while display device 622b is angled inward so as to direct illumination or light inward and toward the body side of the host vehicle for displaying a blind spot detection indicator, such as in a similar manner as described above with respect to display device 522.

As shown in FIG. 18, display receiving portion 630 is formed as part of the back plate 620, such as in a similar manner as described above. A rear surface 630a of display receiving portion 630 is generally V-shaped, with an outward angled display receiving portion 630a' and an inward angled display receiving portion 630a". Each angled portion 630a', 630a" includes or receives or supports a respective circuit element or circuit board 632 (optionally, a single circuit element or circuit board may be established at and across the angled portions 630a', 630a"), with one or more illumination sources or LEDs 634a, 634b established at the circuit element or elements for emitting light through a respective passageway or passageways 630c', 630c" of display receiving portion 630. Each display device 622a, 622b may include a light directing film 636a, 636b, such as described above, and/or a lens cover or cover element 638 (which may comprise separate cover elements or may comprise a single cover element across the display portion) to substantially seal the passageways 630c', 630c" of display receiving portion 630, such as described above.

Thus, display device 622a is operable to activate LED or LEDs 634a, which emits light 635a through light directing film 636a and along passageway or passageways 630c' of display receiving portion 630 and through cover element 638, so that the LEDs emit light in a direction outward and away from the body side of the host vehicle so that the light is readily viewable by a driver of a vehicle at the side and/or rearward of the host vehicle. Similarly, display device 622b is operable to activate LED or LEDs 634b, which emits light 635b through light directing film 636b and along passageway or passageways 630c " of display receiving portion 630 and through cover element 638, so that the LEDs emit light in a direction inward and toward the body side of the host vehicle so that the light is readily viewable by the driver of the host vehicle.

As shown in FIG. 17, the display indicators or areas of the display receiving portion 630 and display device 622 may be selected to be a desired or appropriate shape or form for their respective functions. For example, a display indicator 623a for display device or turn signal indicator device 622a may comprise an arrow or chevron shape or a triangle shape with a tip pointing outward away from the vehicle or other suitable turn signal indicator shape, while a display indicator 623b for display device or blind spot indicator device 622b may comprise a triangular shape with a tip pointing downward or may comprise any other suitable shape or indicator or icon, such as the indicator shown in FIG. 1 or such as other suitable blind spot detection or LCA indicators or icons, such as those described in PCT Application No. PCT/US2006/026148, filed Jul. 5, 2006, which is hereby incorporated herein by reference in its entirety.

Thus, the display elements or devices of the present invention provide a desired or appropriate iconistic display that, when electrically actuated, emits light that is not directed through the mirror reflective element. The display element may be formed with the back plate or may attach to the back plate (such as by snapping to the back plate or the like), and provides the desired angle effect relative to the reflective element. For example, the reflective element may be attached to or snapped into the back plate (which includes the display element at a perimeter region thereof), whereby the display element is thus positioned at a desired or appropriate angle relative to the reflective element to provide the desired or appropriate angle effect for directing the light from the light sources (when electrically actuated) in a desired or predetermined angle relative to the mirror reflective element. Thus, the display element provides the desired or appropriate preset angle when the mirror reflective element is attached to the back plate.

The blind spot indicators of the present invention thus provide a display element or indicator that is disposed at or integrally provided with the back plate. A back plate thus may be provided to a mirror manufacturer with mounting or attachment structure or receiving structure for the display element or display circuitry integrally formed with the back plate. The attachment structure or receiving portion is configured to receive or attach to a display element or display circuitry or indicator element. A mirror assembler or manufacturer may attach the display element to the attachment structure or receiving portion of the back plate (such as by snapping display circuitry or a circuit board at the attachment structure), whereby the display element is oriented at a desired angle relative to the mirror reflective element when attached to the back plate. Thus, illumination emanating from the display element is directed at the desired or appropriate angle for viewing, either by the driver of the host vehicle (for a blind spot detection system) or a driver of another vehicle (for a turn signal indicator).

The blind spot indicators of the present invention thus are operable to provide an indication to the driver of the host vehicle that an object or other vehicle has been detected in the lane or area adjacent to the side of the host vehicle. The blind spot indicator may be operable in association with a blind spot detection system, which may include an imaging sensor or sensors, or an ultrasonic sensor or sensors, or a sonar sensor or sensors or the like. For example, the blind spot detection system may utilize aspects of the blind spot detection and/or imaging systems described in U.S. Pat. Nos. 7,038,577; 6,882,287; 6,198,409; 5,929,786; and/or 5,786,772, and/or U.S. pat. applications, Ser. No. 11/239,980, filed Sep. 30, 2005 by Camilleri et al. for VISION SYSTEM FOR VEHICLE; and/or Ser. No. 11/3 15,675, filed Dec. 22,2005 by Higgins-Luthman for OBJECT DETECTION SYSTEM FOR VEHICLE, and/or U.S. provisional applications, Ser. No. 60/638,687, filed Dec. 23, 2004 by Higgins-Luthman for OBJECT DETECTION SYSTEM FOR VEHICLE; Ser. No. 60/628,709, filed Nov. 17, 2004 by Camilleri et al. for IMAGING AND DISPLAY SYSTEM FOR VEHICLE; Ser. No. 60/614,644, filed Sep. 30, 2004; and/or Ser. No. 60/618,686, filed Oct. 14, 2004 by Laubinger for VEHICLE IMAGING SYSTEM, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 6,717,610 and/or 6,757,109, and/or U.S. pat. application, Ser. No. 10/418,486, filed Apr. 18, 2003 by McMahon et al. for VEHICLE IMAGING SYSTEM, now U.S. Pat. No. 7,005,974, and/or of the automatic headlamp controls described in U.S. Pat. Nos. 5,796,094 and/or 5,715, 093; and/or U.S. pat. application, Ser. No. 11/1 05,757, filed Apr. 14, 2005 by Schofield et al. for IMAGING SYSTEM FOR VEHICLE; and/or U.S. provisional application, Ser. No. 60/607,963, filed Sep. 8,2004 by Schofield for IMAGING SYSTEM FOR VEHICLE, and/or of the rain sensors described in U.S. Pat. Nos. 6,250,148 and 6,341,523, and/or of other imaging systems, such as the types described in U.S. Pat. Nos. 6,353,392 and 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,760,962; 6,097, 023 and 5,796,094, and U.S. pat. application, Ser. No. 09/441, 341, filed Nov. 16,1999 by Schofield et al. for VEHICLE HEADLIGHT CONTROL USING IMAGING SENSOR, now U.S. Pat. No. 7,339,149, and/or PCT Application No. PCT/US2003/036177 filed Nov. 14, 2003, published Jun. 3, 2004 as PCT Publication No. WO 2004/047421 A3, with all of the above referenced U.S. patents, patent applications and provisional applications and PCT applications being commonly assigned and being hereby incorporated herein by reference in their entireties.

Optionally, the indicator or indicators of the present invention may alert the driver of the host vehicle of other situations or status or the like. For example, the indicator could function to alert the driver of the host vehicle that the brake lights of the host vehicle are functioning properly. Other applications or uses of the indicator may be implemented, without affecting the scope of the present invention.

The reflective element of the rearview mirror assembly may comprise an electro-optic or electrochromic reflective element or cell, such as an electrochromic mirror assembly and electrochromic reflective element utilizing principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663;

5,910,854; 5,142,407; and/or 4,712,879, and/or U.S. pat. applications, Ser. No. 10/054,633, filed Jan. 22, 2002 by Lynam et al, for VEHICULAR LIGHTING SYSTEM, now U.S. Pat. No. 7,195,381; Ser. No. 11/021,065, filed Dec. 23, 2004, now U.S. Pat. No. 7,255,451; and/or Ser. No. 11/226,628, filed Sep. 14, 2005 by Karner et al. for MOUNTING ASSEMBLY FOR VEHICLE INTERIOR MIRROR, and/or U.S. provisional applications, Ser. No. 60/695,149, filed Jun. 29, 2005; Ser. No. 60/690,400, filed Jun. 14, 2005; Ser. No. 60/681,250, filed May 16, 2005; and/or 5cr. No. 60/692,113, filed Jun. 20, 2005, which are all hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, G.M. Lampert and C.G. Granquist, EDS., Optical Engineering Press, Wash. (1990), which are hereby incorporated by reference herein in their entireties. The thicknesses and materials of the coatings on the substrates of the electrochromic reflective element, such as on the third surface of the reflective element assembly, may be selected to provide a desired color or tint to the mirror reflective element, such as a blue colored reflector, such as is known in the art and/or such as described in U.S. Pat. Nos. 5,910,854 and 6,420,036, and in PCT Application No. PCT/US03/29776, filed Sep. 9,2003 by Donnelly Corp. et al. for MIRROR REFLECTIVE ELEMENT ASSEMBLY, which are all hereby incorporated herein by reference.

Optionally, use of an elemental semiconductor mirror, such as a silicon metal mirror, such as disclosed in U.S. Pat. Nos. 6,286,965; 6,196,688; 5,535,056; 5,751,489; and 6,065,840, and/or in U.S. pat. application, Ser. No. 10/993,302, filed Nov. 19, 2004 by Lynam for MIRROR REFLECTIVE ELEMENT FOR A VEHICLE, now U.S. Pat. No. 7,338,177, which are all hereby incorporated herein by reference in their entireties, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side exterior rearview mirrors are bent or curved.

Optionally, the reflective element may include a perimeter metallic band, such as the types described in PCT Application No. PCT/US03/29776, filed Sep. 19, 2003 by Donnelly Corp. et al. for ELECTROCHROMIC MIRROR ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY; and/or U.S. pat. applications, Ser. No. 11/021,065, filed Dec. 23, 2004by McCabe et al. for ELECTRO-OPTIC MIRROR CELL, now U.S. Pat. No. 7,255,451; and/or Ser. No. 11/226,628, filed Sep. 14, 2005 by Karner et al. for MOUNTING ASSEMBLY FOR VEHICLE INTERIOR MIRROR; and/or U.S. provisional applications, Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005 Ser. No. 60/638,250, filed Dec. 21, 2004; Ser. No. 60/624,091, filed Nov. 1, 2004 and Ser. No. 60/609,642, filed Sep. 14, 2004, which are all hereby incorporated herein by reference. Optionally, the reflective element may include indicia formed at and viewable at the reflective element, such as by utilizing aspects of the reflective elements described in PCT Application No. PCT/US2006/018567, filed May 15, 2006; and U.S. provisional applications, Ser. No. 60/681,250, filed May 16, 2005, Ser. No. 60/690,400, filed Jun. 14, 2005; Ser. No. 60/695,149, filed Jun. 29, 2005; Ser. No. 60/730,334, filed Oct. 26, 2005; Ser. No. 60/750,199, filed Dec. 14, 2005; and Ser. No. 60/774,449, filed Feb. 17, 2006; and Ser. No. 60/783,496, filed Mar. 18, 2006, which are all hereby incorporated herein by reference in their entireties.

Optionally, the reflective element may comprise a single substrate with a reflective coating at its rear surface, without affecting the scope of the present invention. The mirror assembly thus may comprise a prismatic mirror assembly or other mirror having a single substrate reflective element, such as a mirror assembly utilizing aspects described in U.S. Pat. Nos. 6,318,870; 6,598,980; 5,327,288; 4,948,242; 4,826,289; 4,436,371; and 4,435,042; and PCT Application No. PCT/US04/015424, filed May 18, 2004 by Donnelly Corporation et al. for MIRROR ASSEMBLY FOR VEHICLE; and U.S. patent application, Ser. No. 10/933,842, filed Sep. 3, 2004, now U.S. Pat. No. 7,249,860, which are hereby incorporated herein by reference in their entireties. Optionally, the reflective element may comprise a conventional prismatic or flat reflective element or prism, or may comprise a prismatic or flat reflective element of the types described in PCT Application No. PCT/US03/29776, filed Sep. 19, 2003 by Donnelly Corp. et al, for MIRROR REFLECTIVE ELEMENT ASSEMBLY; U.S. pat. applications, Ser. No. 10/709,434, filed May 5, 2004 by Lynam for MIRROR REFLECTIVE ELEMENT, now U.S. Pat. No 7420756; Ser. No. 10/933,842, filed Sep. 3, 2004 by Kulas et al. for INTERIOR REARVIEW MIRROR ASSEMBLY now U.S. Pat. No. 7,249,860; Ser. No. 11/021,065, filed Dec. 23, 2004 by McCabe et at. for ELECTRO-OPTIC MIRROR CELL, now U.S. Pat. No. 7,255,451; and/or Ser. No. 10/993,302, filed Nov. 19, 2004 by Lynam for MIRROR REFLECTIVE ELEMENT FOR A VEHICLE now U.S. Pat. No 7,338,177, and/or PCT Application No. PCT/US2004/015424, filed May 18, 2004 by Donnelly Corp. et al. for MIRROR ASSEMBLY FOR VEHICLE, which are all hereby incorporated herein by reference in their entireties, without affecting the scope of the present invention.

Optionally, the mirror assembly may include one or more displays, such as the types disclosed in U.S. Pat. Nos. 5,530,240 and/or 6,329,925, which are hereby incorporated herein by reference, and/or display-on-demand or transflective type displays, such as the types disclosed in U.S. Pat. Nos. 6,690,268; 5,668,663 and/or 5,724,187, and/or in U.S. pat. applications, Ser. No. 10/054,633, filed Jan. 22, 2002 by Lynam et al. for VEHICULAR LIGHTING SYSTEM, now U.S. Pat. No. 7,195,381; Ser. No. 10/528,269, filed Mar. 17, 2005, now U.S. Pat. No. 7,274,501; Ser. No. 10/533,762, filed May 4, 2005, now U.S. Pat. No. 7,274,501; Ser. No. 10/538,724, filed Jun. 13, 2005 by Hutzel et al. for ACCESSORY SYSTEM FOR VEHICLE; and/or Ser. No. 11/021,065, filed Dec. 23, 2004 by McCabe et al. for ELECTRO-OPTIC MIRROR CELL, now U.S. Pat. No. 7,255,451; and/or PCT Application No. PCT/US03/29776, filed Sep. 9, 2003 by Donnelly Corp. et al. for MIRROR REFLECTIVE ELEMENT ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY; and/or U.S. provisional applications, Ser. No. 60/630,061, filed Nov. 22, 2004 by Lynam et al. for MIRROR ASSEMBLY WITH VIDEO DISPLAY; Ser. No. 60/667,048,filed Mar. 31, 2005 by Lynam et al. for MIRROR ASSEMBLY WITH VIDEO DISPLAY;

Ser. No. 60/629,926, filed Nov. 22, 2004 by McCabe et al. for METHOD OF MANUFACTURING ELECTRO-OPTIC MIRROR CELL; Ser. No. 60/531,838, filed Dec. 23, 2003; Ser. No. 60/553,842, filed Mar. 17, 2004, and Ser. No. 60/563,342, filed Apr. 19, 2004, and/or PCT Application No. PCT/US03/40611, filed Dec. 19, 2003 by Donnelly Corp. et al. for ACCESSORY SYSThM FOR VEHICLE, which are all hereby incorporated herein by reference in their entireties, or may include or incorporate video displays or the like, such as the types described in PCT Application No. PCT/US03/40611, filed Dec. 19, 2003 by Donnelly Corp. et al. for ACCESSORY SYSTEM FOR VEHICLE, and/or U.S. patent applications, Ser. No. 10/538,724, filed Jun. 13, 2005; and/or Ser. No. 11/284,543, filed Nov. 22, 2005, now U.S. Pat. No. 7,370,983; and/or U.S. provisional applications, Ser. No. 60/630,061, filed Nov. 22, 2004 by Lynam et al. for MIRROR ASSEMBLY WITH VIDEO DISPLAY; and Ser. No. 60/667,048, filed Mar. 31, 2005 by Lynam et al. for MIRROR ASSEMBLY WITH VIDEO DISPLAY, which are hereby incorporated herein by reference in their entireties.

Optionally, the display may be associated with a navigation system and/or a telematics system of the vehicle, such as, for example, an ONSTAR® system as found in General Motors vehicles and/or such as telematics systems and/or navigation systems such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,946,978; 6,477,464; 6,678,614; and/or 7,004,593, and/or U.S. pat. applications, Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; Ser. No. 10/964,512, filed Oct. 13, 2004, now U.S. Pat. No. 7,308,341; Ser. No. 10/538,724, filed Jun. 13, 2005; Ser. No. 11/284,543, filed Nov. 22, 2005, now U.S. Pat. No. 7,370,983 and/or Ser. No. 10/529,715, filed Mar. 30, 2005, which are all hereby incorporated herein by reference in their entireties.

Thus, the display (such as a video display and such as a slide-out video display of the types described in U.S. pat. applications, Ser. No. 10/538,724, filed Jun. 13, 2005; and/or Ser. No. 11/284,543, filed Nov. 22, 2005, now U.S. Pat. No. 7,370,983, which are hereby incorporated herein by reference in their entireties, or such as display on demand transflective display such as those described above) may display directional instructions or information (and may activate or slide-out at an appropriate time for displaying such directional instructions) as the vehicle approaches waypoints along a set or selected navigational route. Optionally, a telematics system (such as ONSTAR® or the like) may provide audible instructions to provide step-by-step vocal instructions to the driver of the vehicle as the vehicle is driven along the set route. For example, an operator at a remote service center may, after receiving instructions from the driver of the vehicle (such as a request for turn-by-turn or other directions for the driver to follow from the location where the driver and vehicle are to a targeted location or destination), provide step-by-step vocal directions to the driver's vehicle via the telematics system. The vehicle-based control or system may digitally record the step-by-step vocal instructions (or the directions may be downloaded to the vehicle-based system), and the audio directions (as keyed or corresponding to specific waypoints along the route) may then be played automatically through the vehicle's speakers of the vehicle's audio system or through other speakers, such as when the vehicle approaches the specific waypoints along the set or selected route (as may be determined by a vehicle-based global positioning system).

Optionally, the display or video display may provide visible step-by-step directional or navigational instructions along the route (such as by utilizing aspects of the systems described in U.S. pat. applications, Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; Ser. No. 10/538,724, filed Jun. 13, 2005; and/or Ser. No. 11/284,543, filed Nov. 22, 2005 now U.S. Pat. No. 7,370,983, which are all hereby incorporated herein by reference in their entireties). Such a display (preferably a display on demand transflective display or through-the-mirror display that displays or projects or emits display information through the mirror reflective element for viewing by the driver of the vehicle) may be activated as the vehicle approaches the next waypoint so that the next turn instruction is displayed only when the vehicle approaches or is proximate to the next waypoint, and then may be deactivated (so that the display may "disappear" or no be longer viewable by the driver of the vehicle) after the waypoint is passed (and then may reappear or reactivate again as the vehicle approaches the next waypoint).

In applications where the display is located behind the mirror reflector of the interior rearview mirror assembly and is operable as a display on demand transflective display, the display may be activated to be viewed through the reflective element and, when the display is deactivated, the mirror functions as a normal reflective mirror to provide a normal rearward field of view to the driver of the vehicle. Such a display on demand transflective display thus provides a covert display that is viewable only when activated and thus only during times when it is appropriate or desired to view the display, and is substantially non-viewable or non-visible at other times.

Optionally, the turn-by-turn or step-by-step display may be associated with or may supplement the audible message from the telematics system operator. This may be beneficial since some drivers or consumers may feel that such audible or vocal turn-by-turn or step-by-step instructions are intrusive to conversations or music listening or the like, and may be "nagging", if continually repeated as the driver approaches each turn or waypoint. Thus, the driver may elect to have the audible instructions or visible display instructions or both during the navigational sequence. The display may display a written text message (such as a text message of the vocal instruction) pertaining to the next instruction (such as "turn left at next intersection" or "take right fork ahead" or "take exit 98" or "turn right on Woodward Avenue" or the like) or may display a graphic or iconistic display (such as a turn arrow or a cross-street map or the like) at the appropriate time corresponding to the vehicle approaching the next waypoint or turn (and/or at an appropriate distance from the next waypoint or turn) along the route (and corresponding to the next vocal or audible message as provided by the remote operator of the telematics system, such as ONSTAR® or the like). Optionally, the distance or time before the waypoint or turn at which the display is activated may vary depending on the speed of the vehicle or other parameters, such as weather or driving or traffic conditions or the like. It is envisioned that the audible or vocal message could be played or communicated once as the vehicle approaches the next waypoint (such as when the vehicle is a predetermined distance or time until arrival at the next waypoint), and the visible display may provide the iconistic display or textual display during the time that elapses between the audible or vocal message and the arrival at the waypoint by the vehicle.

The visible iconistic or textual display/message thus may supplement and/or complement the audio or vocal message. The display system and navigation system thus may receive and process the information provided by ONSTAR® or the like (such as information data and/or vocal message/recording that corresponds to or is coded to a set of parameters that corresponds to and/or defines particular geographical locations or waypoints, such as degrees longitude and latitude of the geographical locations or waypoints), whereby the audible message may be triggered or activated as the vehicle approaches the next waypoint, and the visible message may supplement or complement the audible message. Optionally, the visible information may be displayed without the audible message, which may be particularly appreciated by deaf or hearing impaired drivers.

Optionally, when the display on demand transflective display is not displaying the directional instructions/information (such as between waypoints along the set route), it may be desirable to have the display continue to display other information, such as a compass directional heading display or the like (such as a compass display associated with a compass system of the types described in U.S. Pat. Nos. 7,004,593; 5,924,212; 4,862,594; 4,937,945; 5,131,154; 5,255,442; and/or 5,632,092, and/or U.S. pat. application Ser. No. 11/305,637, filed Dec.16, 2005, now U.S. Pat. No. 7,329,013, which are all hereby incorporated herein by reference in their entireties). In such a situation, it is envisioned that a backlit display (such as a backlit LCD display of the types described in U.S. pat. applications, Ser. No. 10/538,724, filed Jun. 13, 2005; and/or Ser. No. 11/284,543, filed Nov. 22, 2005, now U.S. Pat. No. 7,370,983, which are hereby incorporated herein by reference in their entireties) may have some of the backlighting deactivated (such as a portion or zone of the backlighting that backlights the directional instructions provided at the video LCD display element or monitor), while one or more other portions or elements or zones of the backlighting are activated, so as to continue displaying other information (such as compass directional heading information or icons or characters or the like). For example, with a backlighting device or element that comprises a plurality of illumination or light sources that are operable to backlight a LCD video display (such as a backlit LCD display of the types described in U.S. pat. application Ser. No. 11/284,543, filed Nov. 22, 2005, now U.S. Pat. No. 7,370,983, which is hereby incorporated herein by reference in its entirety), a zone or region of the backlighting device comprising a plurality of adjacent light sources (such as light emitting diodes (LEDs) or the like) may be activated to backlight a corresponding zone or region of the LCD display, while other zones or regions of the backlighting device may be deactivated so as to not backlight the corresponding zones or regions of the LCD display (and thus not displaying information at those zones or regions, even if the LCD display is fully activated).

Thus, if it is desired to not have the entire backlighting device lit or activated, the display may be operable to activate or light a small area (such as about 1 cm$^2$ or thereabouts, or smaller or larger if desired) to backlight compass directional heading information of the display. Thus, the backlighting device or element may be selectively or differentially activated to provide the desired display on demand transflective display at the mirror reflective element, while not displaying other portions of the display when those other portions are not desired to be viewed by the driver. Although described as selectively or differentially activating portions or zones or elements or regions of the display to display directional instructions or information and compass information, it is envisioned that a backlighting element or device of a display may be differentially activated to selectively illuminate or backlight other display portions or display information, such as display information pertaining to a vehicle status (such as a low fuel indicator or oil change indicator or the like) or a telephone or telematics system status or function, or any other suitable display at the interior rearview mirror assembly of the vehicle, while remaining within the spirit and scope of the present invention.

Optionally, the mirror assembly may include an imaging device, such as an imaging array sensor for imaging systems of the types described in U.S. Pat. Nos. 6,757,109; 6,717,610; 6,396,397; 6,201,642; 6,353,392; 6,313,454; 6,396,397; 5,550,677; 5,670,935; 5,796,094; 5,877,897; 6,097,023; and 6,498,620, and U.S. pat. applications, Ser. No. 09/441,341, filed Nov. 16, 1999 by Schofield et al. for VEHICLE HEADLIGHT CONTROL USING IMAGING SENSOR, now U.S. Pat. No. 7,339,149, and Ser. No. 10/427,051, filed Apr. 30, 2003 by Pawlicki et al. for OBJECT DETECTION SYSTEM FOR VEHICLE, now U.S. Pat. No. 7,038,577, which are all hereby incorporated herein by reference in their entireties.

Such displays and imaging systems may be associated with a night vision system. Night vision systems are known in the vehicle imaging art and typically capture images of or data representative or indicative of a forward scene and display or show the captured images to the driver to alert the driver as to what is ahead of or in the path of the vehicle. However, the driver has to look at the display and distinguish what the images are that are captured by the night vision system.

Optionally, a night vision system may include a forward facing sensor that detects or senses objects in a forward field of view ahead of the vehicle as the vehicle travels along the road. For example, a night vision system may include a passive forward facing sensor, such as a far infrared or thermal sensor or imager or the like, or an active forward facing sensor, such as a near infrared sensor or infrared sensor that that captures images of the forward scene as illuminated or flooded by near infrared or infrared light emitting diodes (LEDs) or laser diodes or the like. Such near infrared or infrared energy sources may substantially flood the forward scene with infrared or near infrared energy to enhance the imaging or capturing of image data by a forward facing sensor (which may be at the interior rearview mirror assembly or a windshield electronics module or accessory module or the like, with a forward field of view through the windshield of the vehicle, and which is selected to be sensitive to such infrared or near infrared energy) while limiting or substantially precluding glare to the driver of the host vehicle and other vehicles approaching the host vehicle. An output of the forward facing sensor is fed to or communicated to a processor or control (such as an image processor of the types described in U.S. Pat. No. 7,038,577 and/or U.S. patent applications, Ser. No. 11/408,776, filed Apr. 21, 2006; and/or Ser. No. 11/315,675, filed Dec. 22, 2005, which are all hereby incorporated herein by reference in their entireties, and/or such as a processor of the type incorporated in Mobileye's EyeQ™ system-on-a-chip video-based object detection sensing system, such as is commercially available from Mobileye Vision Technologies Ltd. of Jerusalem, Israel, or such as any other suitable image data processor) that processes the captured image data and determines or detects objects that are in the forward field of view and beyond the visible or viewable range of the driver. When such objects are detected (such as a deer or other object in the road ahead of the vehicle), an alert (such as an audible or visual alert) is generated to alert the driver that the vehicle is approaching an object that is not yet visible or viewable or discernible to the driver of the vehicle.

The alert may be provided as an iconistic display or image display or video display for viewing by the driver of the host vehicle. Desirably, the display may be located at the interior rearview mirror assembly, such as a display on demand type of display at and behind the mirror reflective element of the interior rearview mirror assembly (such as the types disclosed in U.S. Pat. Nos. 6,690,268; 5,668,663 and/or 5,724,187, and/or in U.S. pat. applications, Ser. No. 10/054,633, filed Jan. 22, 2002 by Lynam et al. for VEHICULAR LIGHTING SYSTEM, now U.S. Pat No 7,195,381; Ser. No. 10/528,269, filed Mar. 17, 2005, now U.S. Pat. No. 7,274,501; Ser. No. 10/533,762, filed May 4, 2005, now U.S. Pat No. 7,184,190; Ser. No. 10/538,724, filed Jun. 13, 2005 by Hutzel et al. for ACCESSORY SYSTEM FOR VEHICLE; and/or Ser. No. 11/021,065, filed Dec. 23, 2004 by McCabe et al. for ELECTRO-OPTIC MIRROR CELL, now U.S. Pat. No, 7,255,451, which are all hereby incorporated herein by reference in their entireties), or such as a slide-out display or the like (such as displays of the types described in U.S. patent applications, Ser. No. 10/538,724, filed Jun. 13, 2005; and/or Set. No. 11/284,543, filed Nov. 22, 2005, now U.S. Pat, No. 7,370, 983, which are hereby incorporated herein by reference in their entireties). The display is activated to display the alert or icon or image/images (such as a video image of the forward scene) in response to a detection of an object by the sensor or imager, and thus is an episodal type of display that is fled to the detection of an object and is activated to display pertinent information to the driver of the vehicle and is deactivated when no object is detected in the forward scene. Thus, the display may provide episodal displays or images or icons as needed to alert the driver that the vehicle is approaching an object that may not yet be visible to the driver, yet is deactivated when not needed so as to avoid bothering or distracting the driver when no object is detected ahead of the vehicle.

Changes and modifications to the specifically described embodiments may be carried out without departing from the present invention, which is intended to be limited only by the appended claims as interpreted according to the principles of patent law.

The invention claimed is:

1. A mirror reflective element sub-assembly for an exterior rearview mirror assembly of a vehicle, said mirror reflective element sub-assembly comprising:

a mirror reflective element;

a mirror back plate attached at a rear surface of said mirror reflective element, said mirror back plate comprising a generally planar portion having a front back plate surface facing said rear surface of said mirror reflective element and a rear back plate surface rearward of and spaced from said front back plate surface by a thickness dimension of said generally planar portion of said mirror back plate, said mirror back plate formed by injection molding and having a display receiving portion established thereat during injection molding of said mirror back plate;

wherein said display receiving portion comprises a hollow structure that extends from said generally planar portion of said mirror back plate, said display receiving portion having an open first end region at said generally planar portion and an open second end region opposite said open first end region;

said mirror back plate having structure established at said rear back plate surface during injection molding of said mirror back plate, said structure for attaching said mirror back plate to a mirror actuator;

a display element having a light source that is activatable to emit light, wherein said display receiving portion of said mirror back plate is configured to receive said display element and wherein said display element is at least partially received at said open second end region of said display receiving portion so as to be received at said display receiving portion from a position rearward of said rear back plate surface of said mirror back plate;

said display element attaching to said display receiving portion of said mirror back plate and said light source being activatable to emit light through said display receiving portion; and wherein said mirror back plate and said display receiving portion are configured so that light exiting said mirror back plate is at a predetermined angle so that light emitted by said display element when said light source is activated is directed one of (a) generally away from the vehicle when the mirror assembly is mounted to the vehicle so as to be principally viewed by drivers of other vehicles and so as to be substantially not viewed by the driver of the host vehicle, and (b) generally toward the driver of the vehicle when the mirror assembly is mounted to the vehicle so as to be principally viewed by the driver of the host vehicle and so as to be substantially not viewed by drivers of other vehicles.

2. The mirror reflective element sub-assembly of claim 1, wherein said display element makes mechanical connection with said display receiving portion when attached thereto.

3. The mirror reflective element sub-assembly of claim 2, wherein said display element makes electrical connection with said display receiving portion when attached thereto.

4. The mirror reflective element sub-assembly of claim 1, wherein said light emanating from said display element when said light source is activated passes through said reflective element before exiting said mirror reflective element sub-assembly.

5. The mirror reflective element sub-assembly of claim 4, wherein said display receiving portion includes at least one passageway therethrough, said emitted light being directed through said at least one passageway.

6. The mirror reflective element sub-assembly of claim 5 further comprising a cover element at a forward surface of said display receiving portion.

7. The mirror reflective element sub-assembly of claim 6, wherein said cover element substantially seals said at least one passageway of said display receiving portion.

8. The mirror reflective element sub-assembly of claim 5, wherein said at least one passageway is at least partially filled between said open first end region and said open second end region with a substantially transparent or translucent material to substantially seal said at least one passageway and to allow light to pass through said at least one passageway.

9. The mirror reflective element sub-assembly of claim 1, wherein said light emanating from said display element when said light source is activated does not pass through said reflective element before exiting said mirror reflective element sub-assembly.

10. The mirror reflective element sub-assembly of claim 9, wherein said light emanating from said display element when said light source is activated is directed through said display receiving portion at a location separate from said reflective element.

11. The mirror reflective element sub-assembly of claim 1, wherein said back plate is adhered at said rear surface of said reflective element.

12. The mirror reflective element sub-assembly of claim 1 further comprising a heater pad disposed between said back plate and said reflective element.

13. The mirror reflective element sub-assembly of claim 1, wherein said light emanating from said display element when said light source is activated is directed generally toward the driver of the vehicle when the mirror assembly is mounted at the vehicle so as to be principally viewed by the driver of the vehicle and so as to be substantially not viewed by drivers of other vehicles.

14. The mirror reflective element sub-assembly of claim 13, wherein said display element is associated with a blind spot detection system of the vehicle.

15. The mirror reflective element sub-assembly of claim 1, wherein said light emanating from said display element when said light source is activated is directed generally away from the vehicle when the mirror assembly is mounted at the vehicle so as to be principally viewed by drivers of other vehicles and so as to be substantially not viewed by the driver of the host vehicle.

16. The mirror reflective element sub-assembly of claim 15, wherein said display element is associated with a turn signal of the vehicle.

17. A mirror reflective element sub-assembly for an exterior rearview mirror assembly of a vehicle, said mirror reflective element sub-assembly comprising:

a mirror reflective element;
a mirror back plate attached at a rear surface of said mirror reflective element, said mirror back plate comprising a generally planar portion having a front back plate surface facing said rear surface of said mirror reflective element and a rear back plate surface rearward of and spaced from said front back plate surface by a thickness dimension of said generally planar portion of said mirror back plate, said mirror back plate formed by injection molding and having a display receiving portion established thereat during injection molding of said mirror back plate;
wherein said display receiving portion comprises a hollow structure that extends from said generally planar portion of said mirror back plate, said display receiving portion comprising at least one passageway having an open first end region at said generally planar portion and an open second end region opposite said open first end region;
said mirror back plate having structure established at said rear back plate surface during injection molding of said mirror back plate, said structure for attaching said mirror back plate to a mirror actuator;
a display element having a light source that is activatable to emit light, wherein said display receiving portion of said mirror back plate is configured to receive said display element and wherein said display element is at least partially received at said open second end region of said display receiving portion so as to be received at said display receiving portion from a position rearward of said rear back plate surface of said mirror back plate;
said display element attaching to said display receiving portion of said mirror back plate and said light source being activatable to emit light through said at least one passageway through said display receiving portion;
a cover element disposed at a forward surface of said display receiving portion, said cover element at least partially covering said open first end region of said at least one passageway;
wherein said light emitted by said display element when said light source is activated is directed through said at least one passageway through said display receiving portion at a location separate from said reflective element; and
wherein said mirror back plate and said display receiving portion are configured so that light exiting said mirror back plate is at a predetermined angle so that light emitted by said display element when said light source is activated is directed one of (a) generally away from the vehicle when the mirror assembly is mounted to the vehicle so as to be principally viewed by drivers of other vehicles and so as to be substantially not viewed by the driver of the host vehicle, and (b) generally toward the driver of the vehicle when the mirror assembly is mounted to the vehicle so as to be principally viewed by the driver of the host vehicle and so as to be substantially not viewed by drivers of other vehicles.

18. The mirror reflective element sub-assembly of claim 17, wherein said display element makes mechanical connection with said display receiving portion when attached thereto.

19. The mirror reflective element sub-assembly of claim 18, wherein said display element makes electrical connection with said display receiving portion when attached thereto.

20. The mirror reflective element sub-assembly of claim 17, wherein said cover element substantially seals said at least one passageway of said display receiving portion.

21. The mirror reflective element sub-assembly of claim 17, wherein said back plate is adhered at said rear surface of said reflective element.

22. The mirror reflective element sub-assembly of claim 17, wherein said at least one passageway comprises a plurality of passageways arranged in a pattern at said display receiving portion.

23. A mirror reflective element sub-assembly for an exterior rearview mirror assembly of a vehicle, said mirror reflective element sub-assembly comprising:

a mirror reflective element;
a mirror back plate attached at a rear surface of said mirror reflective element, said mirror back plate comprising a generally planar portion having a front back plate surface facing said rear surface of said mirror reflective element and a rear back plate surface rearward of and spaced from said front back plate surface by a thickness dimension of said generally planar portion of said mirror back plate, said mirror back plate formed by injection molding and having first and second display receiving portions established thereat during injection molding of said mirror back plate;
wherein each of said first and second display receiving portions comprises a hollow structure that extends from said generally planar portion, each of said first and second display receiving portions having an open first end region at said generally planar portion and an open second end region opposite open first end region;
said mirror back plate having structure established at said rear back plate surface during injection molding of said mirror back plate, said structure for attaching said mirror back plate to a mirror actuator;
a first display element having a first light source that is activatable to emit light, wherein said first display receiving portion of said mirror back plate is configured to receive said first display element and wherein said first display element is at least partially received at said open second end region of said first display receiving portion so as to be received at said first display receiving portion from a position rearward of said rear back plate surface of said mirror back plate;
said first display element attaching to said first display receiving portion of said mirror back plate, and said first light source being activatable to emit light through said first display receiving portion;
a second display element having a second light source that is activatable to emit light, wherein said second display receiving portion of said mirror back plate is configured to receive said second display element and wherein said second display element is at least partially received at said open second end region of said second display receiving portion so as to be received at said second display receiving portion from a position rearward of said rear back plate surface of said mirror back plate;

said second display element attaching to said second display receiving portion of said mirror back plate, and said second light source being activatable to emit light through said second display receiving portion;

wherein said light emitted by said first and second display elements when said first and second light sources are activated is directed through said respective first and second display receiving portions at respective locations separate from said reflective element, so that light emitted by said first and second light sources does not pass through said reflective element before exiting said mirror sub-assembly;

wherein said first display receiving portion is configured so that light exiting said mirror back plate is at a first predetermined angle so that light emitted by said first display element when said first light source is activated is directed generally away from the vehicle when the mirror assembly is mounted to the vehicle so as to be principally viewed by drivers of other vehicles and so as to be substantially not viewed by the driver of the host vehicle; and wherein said second display receiving portion is configured so that light exiting said mirror back plate is at a second predetermined angle so that light emitted by said second display element when said second light source is activated is directed generally toward the driver of the vehicle when the mirror assembly is mounted to the vehicle so as to be principally viewed by the driver of the host vehicle and so as to be substantially not viewed by drivers of other vehicles.

24. The mirror reflective element sub-assembly of claim 23, wherein said first and second display elements make mechanical connection with said first and second display receiving portions, respectively, when attached thereto.

25. The mirror reflective element sub-assembly of claim 24, wherein said first and second display elements make electrical connection with said first and second display receiving portions, respectively, when attached thereto.

26. The mirror reflective element sub-assembly of claim 23, wherein each of said first and second display receiving portions includes at least one passageway therethrough, said emitted light being directed through said at least one passageway.

27. The mirror reflective element sub-assembly of claim 26 further comprising at least one cover element at a forward surface of said first and second display receiving portions.

28. The mirror reflective element sub-assembly of claim 27, wherein said at least one cover element substantially seals said passageways of said first and second display receiving portions.

29. The mirror reflective element sub-assembly of claim 26, wherein said passageways are at least partially filled between said open first end regions and said open second end regions with a substantially transparent or translucent material to substantially seal said passageways and to allow light to pass through said passageways.

30. The mirror reflective element sub-assembly of claim 23, wherein said first display element is associated with a turn signal of the vehicle.

31. The mirror reflective element sub-assembly of claim 23, wherein said second display element is associated with a blind spot detection system of the vehicle.

32. The mirror reflective element sub-assembly of claim 23, wherein said first and second display receiving portions are separate from one another.

33. The mirror reflective element sub-assembly of claim 32, wherein said first display receiving portion is located at an outboard and upper region of said mirror reflective element sub-assembly.

34. The mirror reflective element sub-assembly of claim 32, wherein said second display receiving portion is located at an inboard region of said mirror reflective element sub-assembly.

35. The mirror reflective element sub-assembly of claim 23, wherein said first and second display receiving portions are adjacent one another.

36. The mirror reflective element sub-assembly of claim 23, wherein said first and second display receiving portions are unitarily formed and comprise a unitary display receiving portion of said mirror back plate.

* * * * *

UNITED STATES PATENT AND TRADEMARK OFFICE
CERTIFICATE OF CORRECTION

PATENT NO. : 7,581,859 B2 Page 1 of 2
APPLICATION NO. : 11/520193
DATED : September 1, 2009
INVENTOR(S) : Niall R. Lynam It is certified that error appears in the above-identified patent and that said Letters Patent is hereby corrected as shown below:

Column 11:
Line 24, Delete "." after "area".

Column 12:
Line 43, "33 l*a*" should be --331*a*--.

Column 16:
Line 17, "flame" should be --frame--.
Line 25, Insert --now-- before "U.S.".

Column 18:
Line 35, "fight" should be --light--.

Column 28:
Line 62, "clement" should be --element--.

Column 29:
Line 10, "5cr." should be --Ser.--.
Line 11, "arc" should be --are--.
Line 19, "G.M." should be --C.M.--.

Column 30:
Line 54, "7,274,501" should be --7,184,190--.

Column 31:
Line 7, "SYSThm" should be --SYSTEM--.

Column 35:
Line 16, "Set. No." should be --Ser. No.--.
Line 22, "fled" should be --tied--.
Line 32, Insert --the principles of-- before "the".
Line 33, Insert --the scope of-- before "the".

Signed and Sealed this

Fourth Day of May, 2010

David J. Kappos
*Director of the United States Patent and Trademark Office*

Column 38:
Line 46, Claim 23, Insert --said-- after "opposite".